United States Patent [19]

Hudson

[11] Patent Number: 4,695,991
[45] Date of Patent: Sep. 22, 1987

[54] READING INFORMATION STORED IN MULTIPLE FRAME FORMAT

[75] Inventor: Geoffrey M. Hudson, Fitzroy, Australia

[73] Assignee: Storage Research Pty. Ltd., Hawthorn, Australia

[21] Appl. No.: 602,453

[22] Filed: Apr. 20, 1984

Related U.S. Application Data

[63] Continuation-in-part of Ser. No. 403,763, Jul. 28, 1982, abandoned.

[30] Foreign Application Priority Data

Dec. 9, 1980 [AU] Australia ............... PE6831
Dec. 9, 1981 [AU] Australia ........... PCT/AU81/00188
Nov. 8, 1983 [AU] Australia ............. PG2272

[51] Int. Cl.$^4$ .................. G11B 7/09; G11B 20/10
[52] U.S. Cl. ........................... 369/44; 369/46; 369/59; 369/97; 369/120; 235/456; 250/202; 250/570
[58] Field of Search ............. 369/44, 46, 120, 59, 369/93, 125, 97, 112, 119; 360/77, 38.1; 235/494, 456; 250/202, 578, 570, 569, 568; 371/31

[56] References Cited

U.S. PATENT DOCUMENTS

| | | | |
|---|---|---|---|
| 3,072,889 | 1/1963 | Willcox | 340/173 |
| 3,322,935 | 7/1963 | Wyke | 235/61.11 |
| 3,437,793 | 4/1969 | Van Berkel et al. | 235/438 |
| 3,542,286 | 11/1970 | Binkley et al. | 235/474 |
| 3,718,914 | 2/1973 | Muller | 365/128 |
| 3,727,183 | 4/1973 | Le Mar | 340/146.34 |
| 3,780,266 | 12/1973 | Mudsam et al. | 235/61.11 D |
| 3,795,902 | 3/1974 | Russell | 340/173 |

(List continued on next page.)

FOREIGN PATENT DOCUMENTS

| | | |
|---|---|---|
| 2758857 | 11/1957 | Australia . |
| 66189 | 9/1972 | Belgium . |
| 0007660 | 2/1980 | European Pat. Off. . |
| 0018211 | 10/1980 | European Pat. Off. . |
| 0033240 | 8/1981 | European Pat. Off. . |
| WO82/03698 | 10/1982 | World Int. Prop. O. . |
| 968808 | 9/1964 | United Kingdom . |
| 1117419 | 6/1968 | United Kingdom . |
| 2027963 | 2/1980 | United Kingdom . |

OTHER PUBLICATIONS

Patents Abstracts of Japan, vol. 6, No. 237 (P-157) (1115) Nov. 25, 1982.
Patents Abstracts of Japan, vol. 1, No. 129, Oct. 25, 1977, p. 5869 E 77.

Primary Examiner—Alan Faber
Attorney, Agent, or Firm—Cushman, Darby & Cushman

[57] ABSTRACT

Information stored in a medium as multiple machine readable record entries arranged in frames which are themselves arranged in one or more channels may be read by observing each frame in turn with a substantially known array of detector elements, each having a limited field of observation, producing a set of observed values for each frame. Modified values, indicative of the record entries of the frame, may be generated utilizing both the limitations on the range of the possible values of the record entries and predetermined manipulations of the observed values. As a result, any fractional misregistration between the record entries and the detector elements may be corrected. Position markers may be employed to determine where reading should occur. To distinguish local faults in the position markers, the markers may be observed in turn and values indicating marker position may be stored for a predetermined number of preceding markers. It may then be determined whether each observed valve is outside of a selected trend established by the stored valves for more than a predetermined margin. If so, the effect of that value is reduced. Markers may be employed at the leading ends of the channels and at locations along the channels, and may be of distinctive shape to maximize the information contained therein. A semiconductor device employing a field effect transistor structure may be employed to read the data on the medium.

59 Claims, 28 Drawing Figures

U.S. PATENT DOCUMENTS

| | | | |
|---|---|---|---|
| 3,872,445 | 3/1976 | Pease et al. | 340/173 |
| 3,896,295 | 7/1975 | La Plante | 235/487 |
| 3,919,697 | 11/1975 | Walker | 360/77 |
| 3,959,784 | 5/1976 | Meier | 340/173 LM |
| 4,009,388 | 2/1977 | Seachman | 250/578 |
| 4,087,166 | 5/1978 | Rothbart et al. | 353/26 A |
| 4,118,735 | 10/1978 | Wilkinson | 365/124 |
| 4,149,269 | 4/1979 | Åbe et al. | 365/215 |
| 4,198,701 | 4/1980 | Reddersen et al. | 365/127 |
| 4,224,480 | 9/1980 | Satoh | 369/44 |
| 4,228,468 | 10/1980 | Hogan | 358/280 |
| 4,251,126 | 2/1981 | Minoura et al. | 350/6.6 |
| 4,286,318 | 8/1981 | Immink | 369/44 |
| 4,327,377 | 4/1982 | Takken | 250/578 |
| 4,416,001 | 11/1983 | Ackerman | 369/100 |
| 4,430,563 | 2/1984 | Harrington | 235/494 |
| 4,465,939 | 8/1984 | Tamura | 250/578 |
| 4,497,055 | 1/1985 | Hoshino | 360/38.1 |

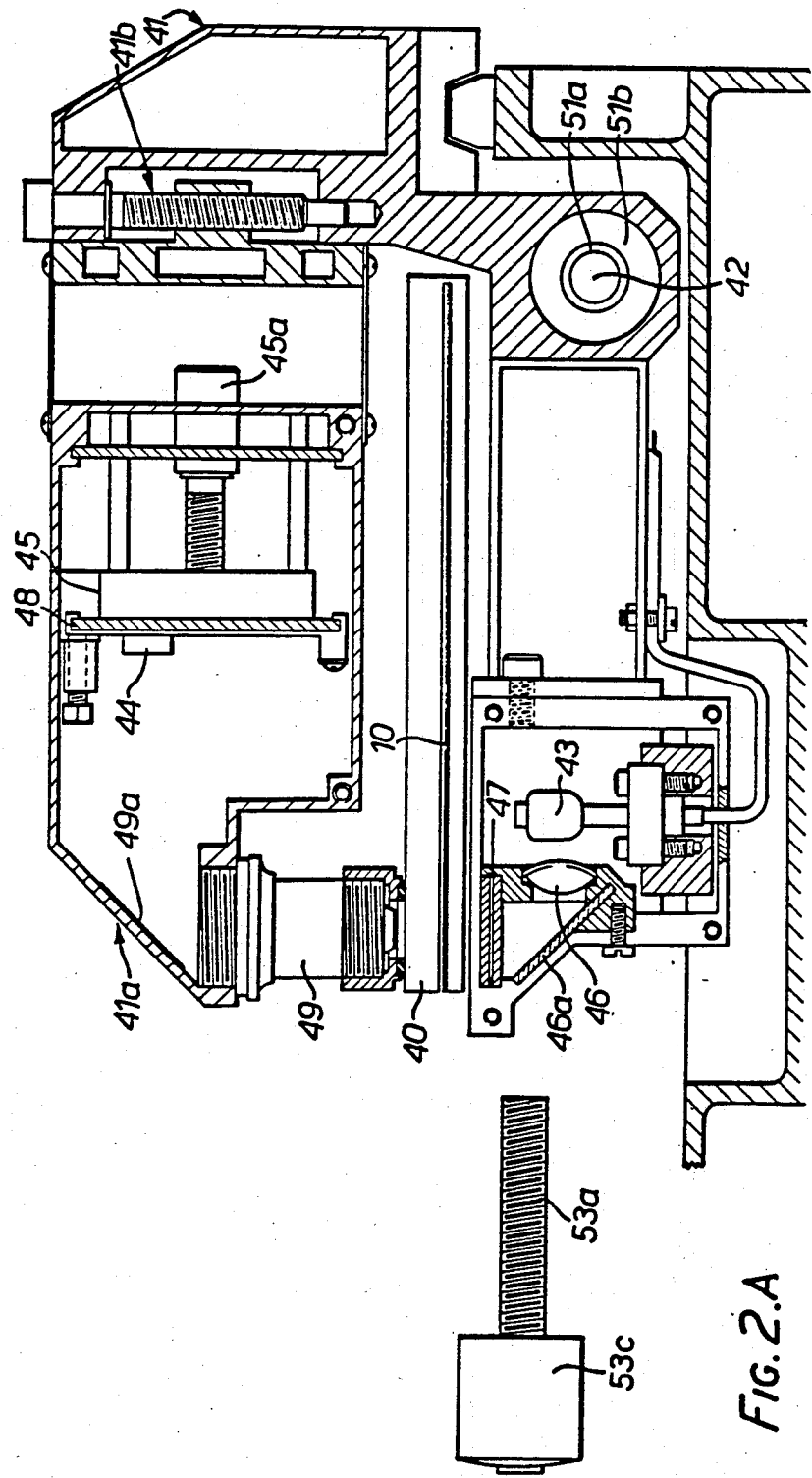
FIG. 2.A

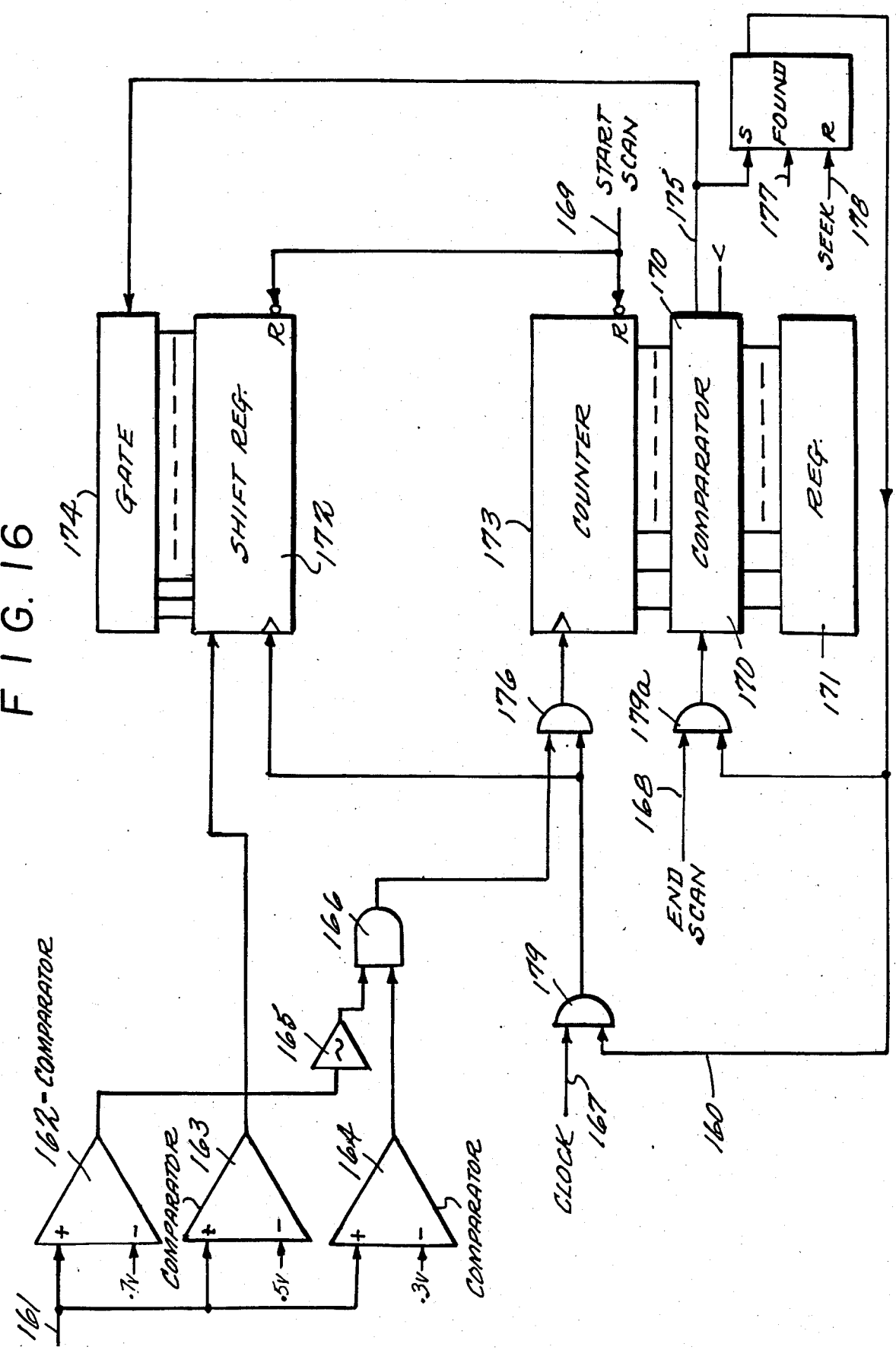

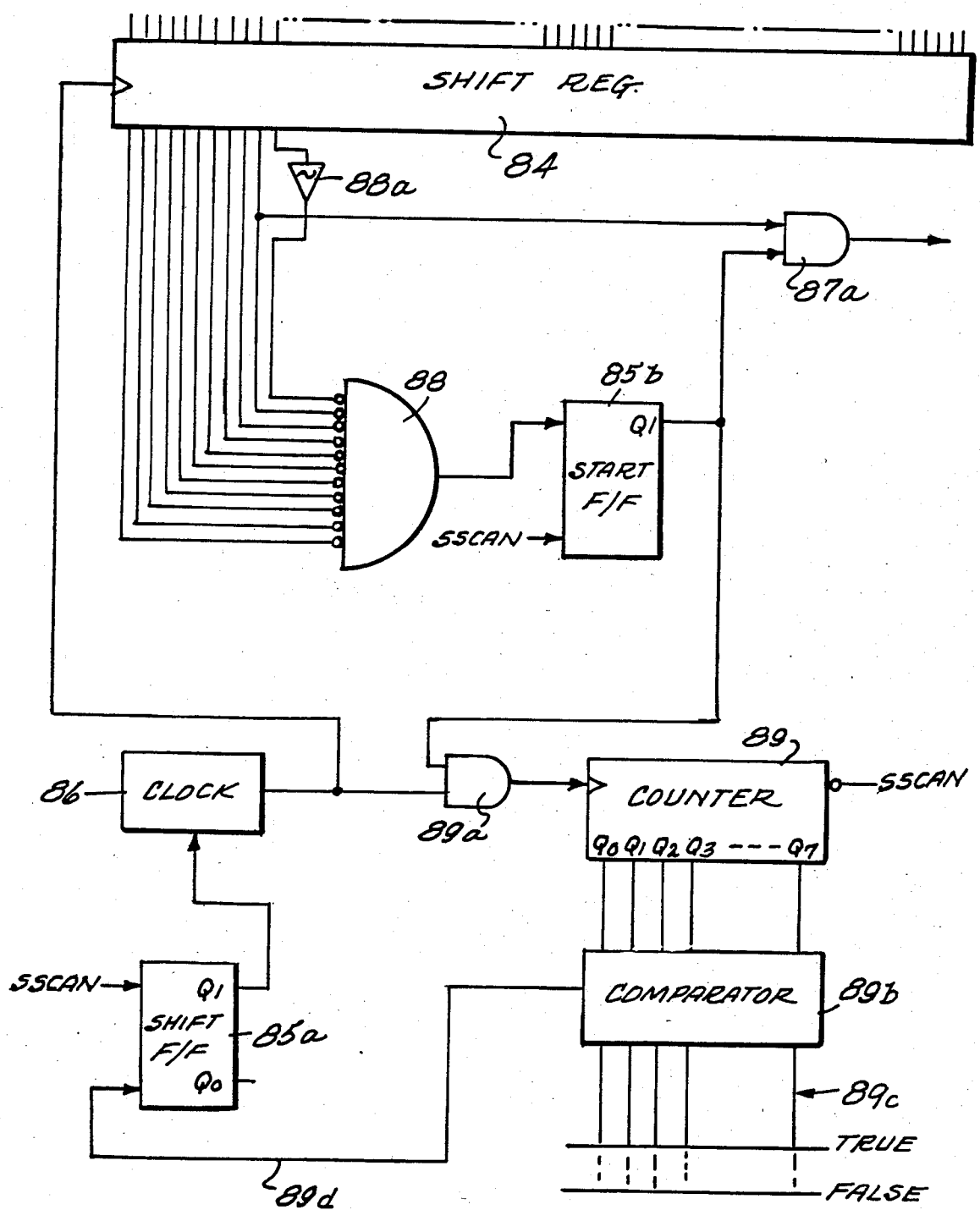
F I G. 17

FIG. 18A
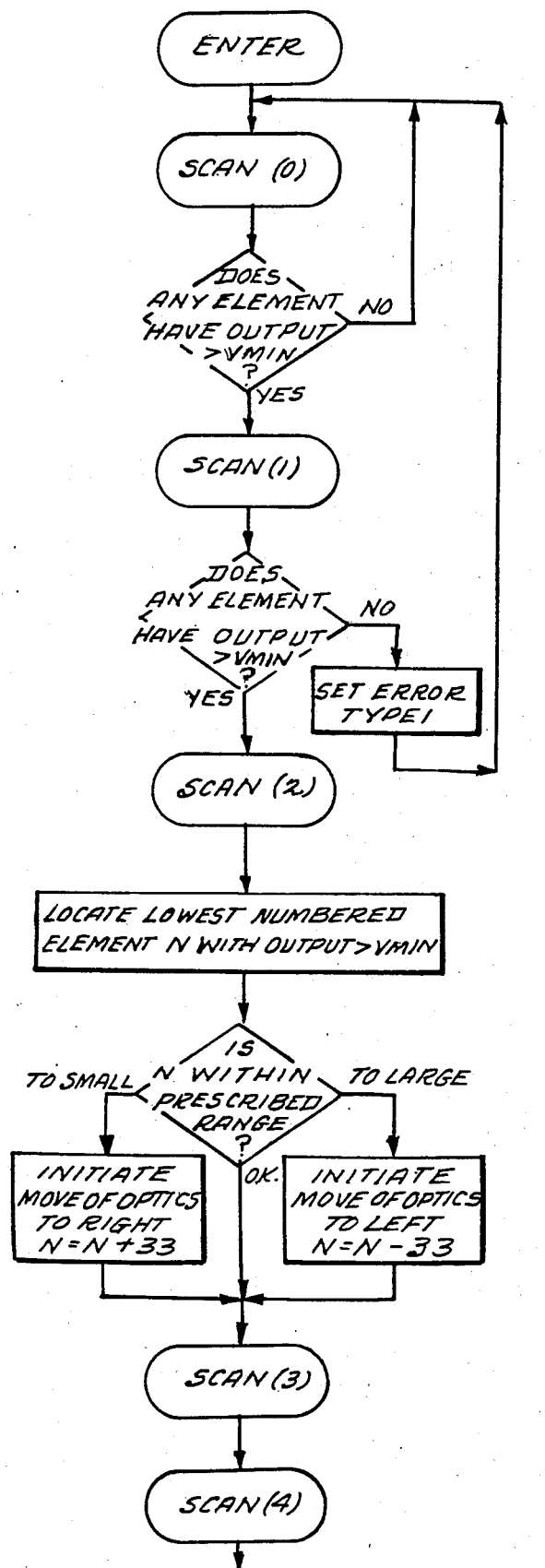
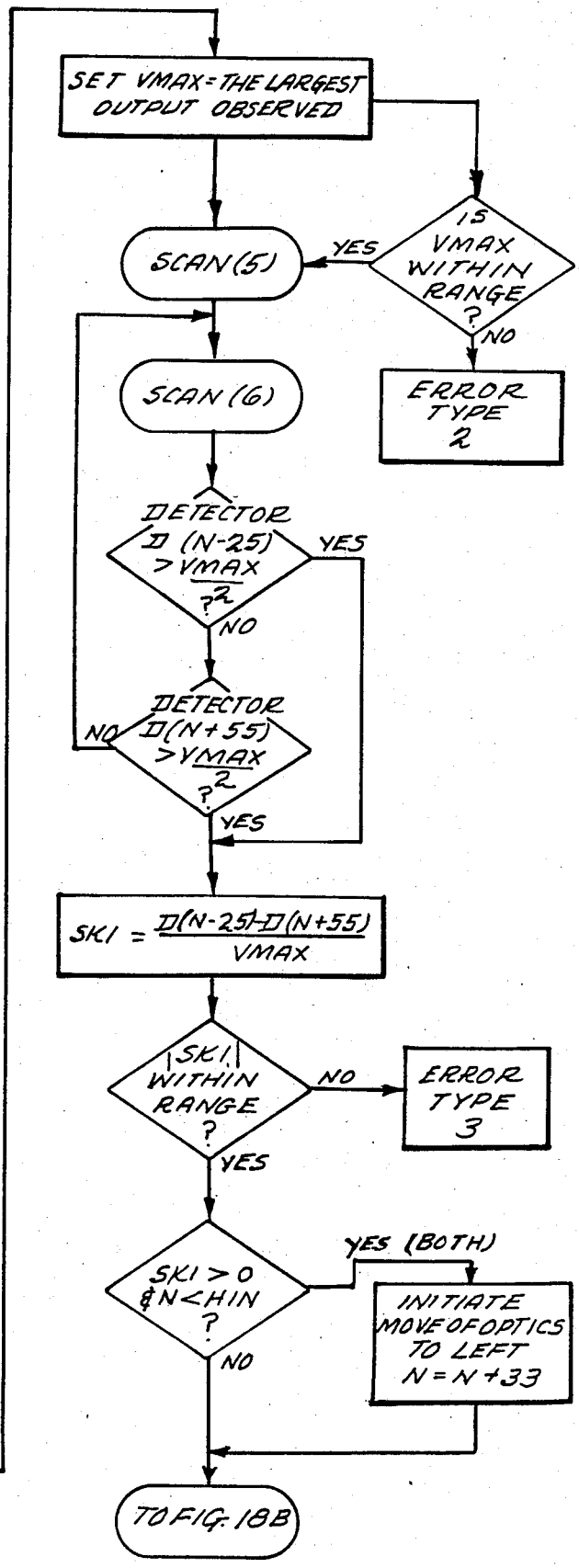

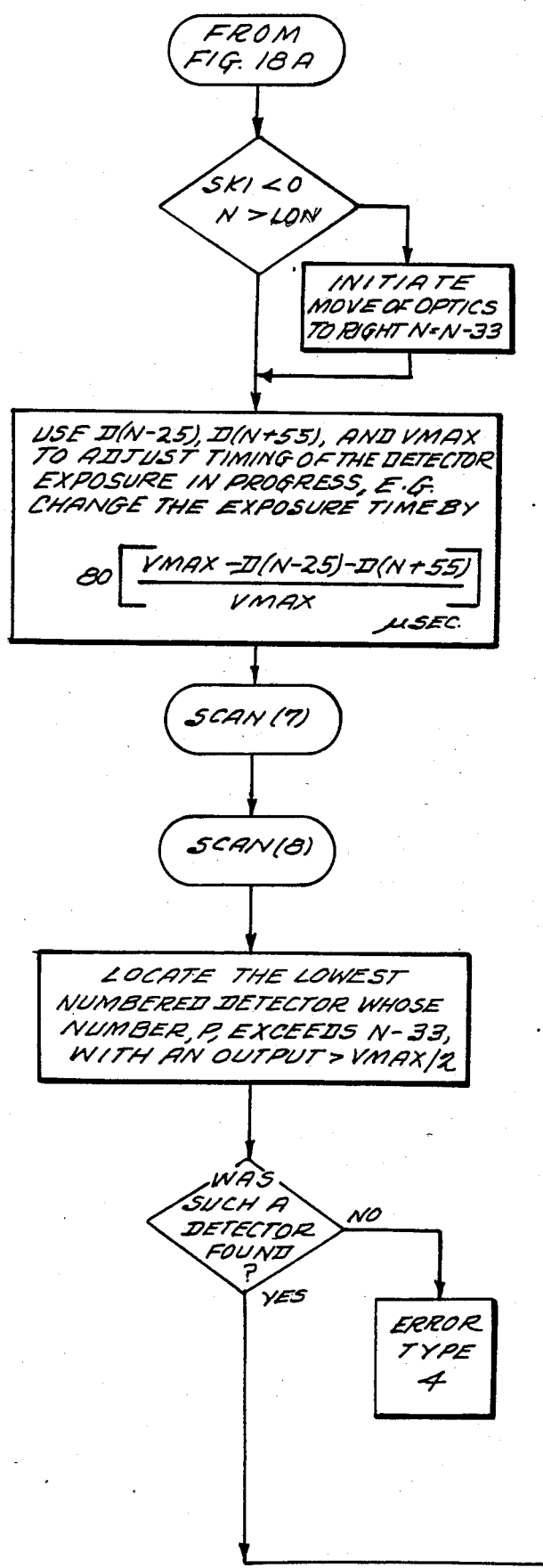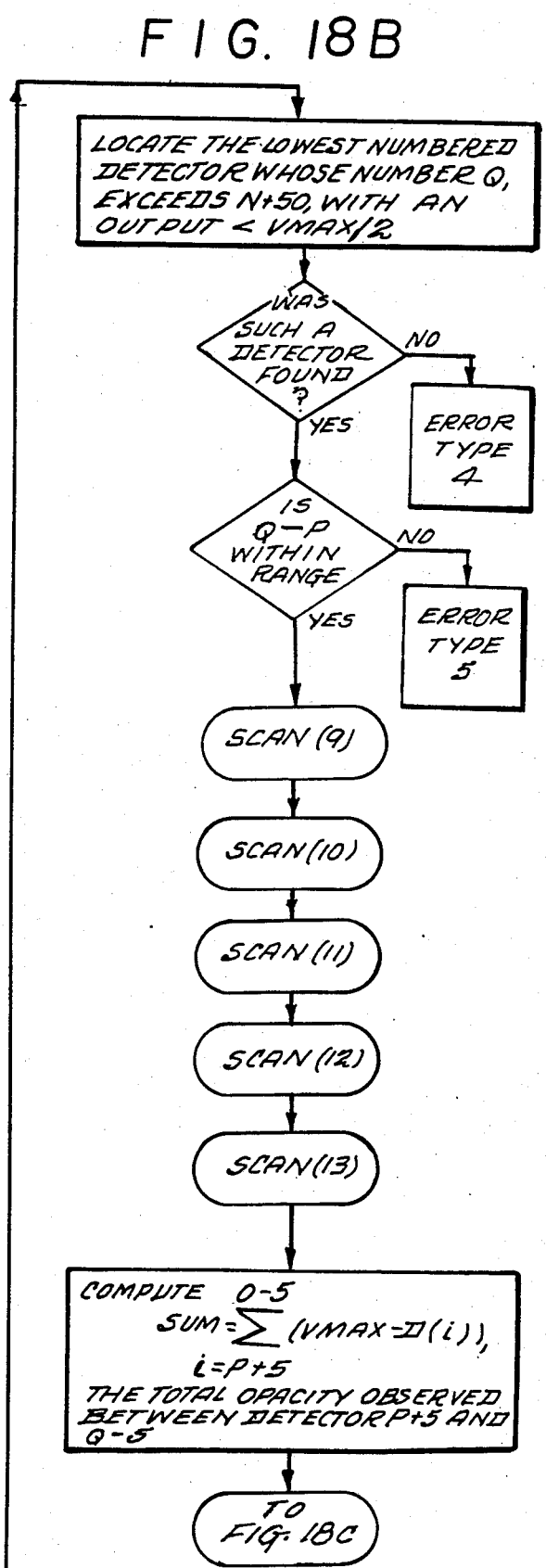
FIG. 18B

FIG. 18C
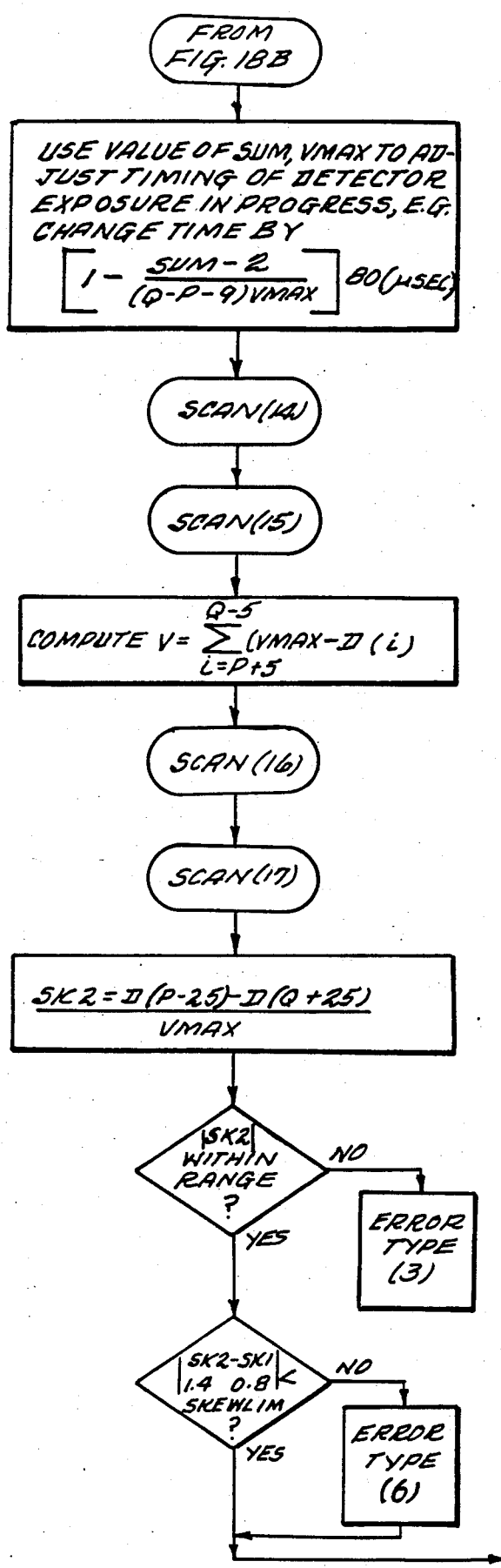
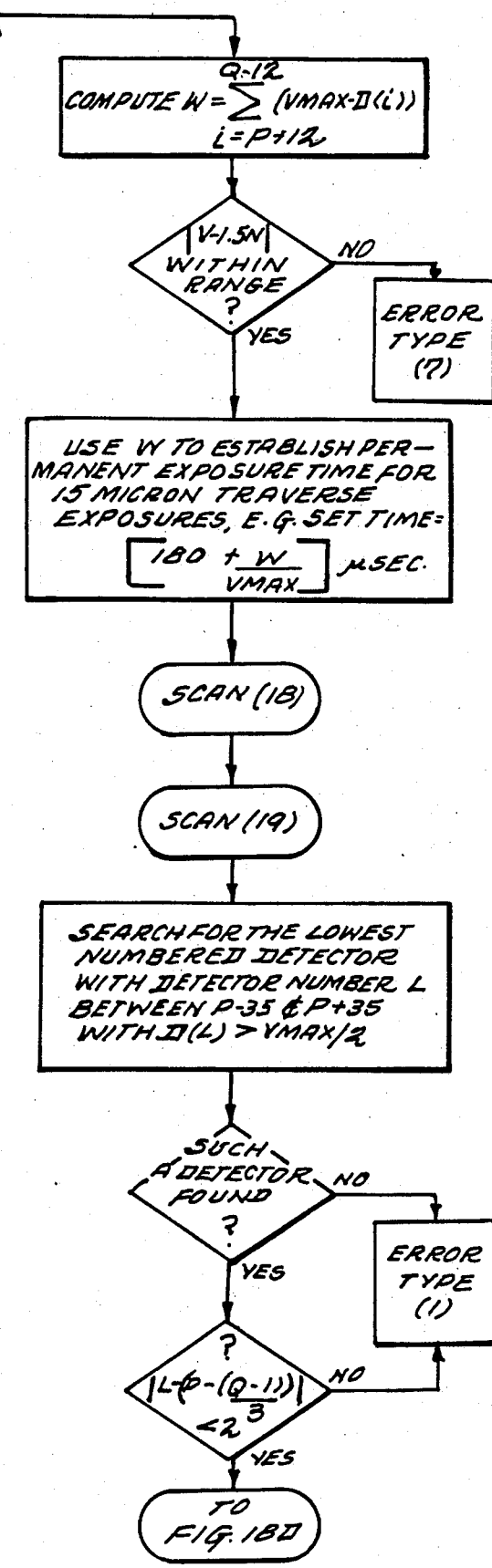

PROCESS MARKER

READING INFORMATION STORED IN MULTIPLE FRAME FORMAT

This application is a continuation-in-part of application Ser. No. 403,763, filed Jul. 28, 1982, to be abandoned after filing this application.

CONTENTS

FIELD OF THE INVENTION
BACKGROUND TO THE INVENTION
SUMMARY OF THE INVENTION
   Correcting for Fractional Misregistration
   Synchronization
   Distinguishing Local Faults in Position Indicators
   Semiconductor Device
BRIEF DESCRIPTION OF THE DRAWINGS
DETAILED DESCRIPTION OF THE PREFERRED EMBODIMENTS
   Correcting for Fractional Misregistration
     First Embodiment
     Second Embodiment
     Third Embodiment
     Fourth Embodiment
     Fifth Embodiment
   Correcting for Integral Misregistration
   Synchronization Using Markers
     Channel Synchronization
     Frame Synchronization
   Distinguishing Local Faults in Position Markers
CLAIMS

FIELD OF THE INVENTION

This invention relates to the reading of information stored in a medium as multiple machine readable record entries arranged in frames which are themselves arranged in one or more channels. The record entries may typically be bits of digital data. In one aspect, the invention is concerned with overcoming fractional misregistration between the record entries and the detector elements of the reading head, with a view to rendering more practical the storage of digital data in optically scannable form such as on photographic film or on microfiche.

In other aspects, the invention is directed to the achievement of synchronization between the reading head and the channels and frames, and or to compensating for any lack of synchronization by way of integral misregistration between the detector elements and the record entries. Finally, the invention provides an arrangement for distinguishing local faults in position indicators from true indications of position errors.

It will be appreciated that, in the present context, misregistration may refer to the case where the detector elements are displaced by an integral multiple of record entry spacings, or to the case of fractional misregistration. The latter may arise from misalignment of detector elements with respect to the record entries to the extent of only a portion of the width of a detector element entry, or from detector and record entry spacings which are not related by an integral multiplicand. Each form of misregistration is addressed by a respective aspect of the invention.

BACKGROUND TO THE INVENTION

Various arrangements have been proposed for reading digital data encoded on optically sensitive media. These have included semi-mechanical devices involving steerable mirrors in an optical magnifier disposed between the record frames and optically responsive detection equipment. Such devices are shown, for example, in U.S. Pat. Nos. 4,251,126 to Minoura et al, 3,072,889 to Willcox and, in the context of videodiscs, in U.S. Pat. No. 4,118,735 to Wilkinson. For higher speed readout, an optically based system employing prism optics to project images of multiply coloured record frames onto successive charge storage detectors, is disclosed in U.S. Pat. No. 3,959,784.

The advantages of optically readable storage relative to magnetic tape storage and the like are appreciated: magnetic tapes recorded at 10,000 bits per linear inch, can store 160,000 bits per square inch, while optical media, at 30 square microns per bit, can provide a data density 134 times greater. In situations such as distribution of information, where a read-only facility is appropriate, this increase in data density can provide significant advantage. However, such advantage is presently outweighed by the complexity and costs of adequate registration mechanisms for data of the improved density which can be achieved with optical media. Data storage in this form is simply not presently economical notwithstanding the known advantages potentially available.

The traditional approach to achieving adequate registration between read heads and data has been to ensure sufficient mechanical precision in the location of read heads with respect to the channels in which the record frames are arranged. In the case of magnetic tape storage, for example, the 7 or 9 heads each read their own track, and the tape is aligned mechanically to prevent a read head reading the wrong track. As the density of data increases, the mechanical difficulty of the registration operation also increases and the cost of the required mechanism rises. This is well demonstrated in the case of videodiscs, where a single laser beam is servo guided along a track 1 micron wide. U.S. Pat. No. 3,919,697 to Walker discloses an arrangement in which the data channels or tracks are bordered and separated by "tracking information" to maintain head alignments.

U.S. Pat. No. 3,322,935 to Wyke discloses an optical barcode reader arranged to compensate for misregistration between the read head and the barcode. The technique requires a substantial number of detectors per bar element and each detector is of a type having a simple 2-level output. As described, a chain of such detectors is employed to distinguish elements of immediately adjacent bar lines. One boundary of the pair of bar lines is first located, and a signal characteristic of the position of that boundary is then correlated with overlapping matrices of detector values to select five of the ten values which are most nearly centred on the respective bar elements and which therefore have the best chance to be scanning correct information. The five selected values are then fed to a majority selective matrix from which a reading is output if signals are derived from a majority of the selected detectors according to specified criteria. It will be appreciated that the final pair of output signals are simply selected ones of the detector outputs and that, given the requirement for multiple detectors per data bit and complex circuitry needed to located the barline boundary, the method is not readily adaptable to highly densely stored data.

U.S. Pat. No. 3,795,902 to Russell discloses a recording and playback system in which synchronization is secured for playback by detection of and response to a configuration of digital signal, either from known characteristics of the signal or from information added to the signal during recording. The information thus read out is suitably employed for shifting digital words in a reassembly shift register until proper word synchronization is achieved.

Even once synchronization has been initially achieved, local faults may arise in the regular position indicators or markers by which synchronization is sustained. Many devices currently exist which need to determine the position of a read head relative to data, but most such devices are read/write in that they can record data as well as read it. Any fault during the writing process may result in mispositioned data and the reading process needs to recognize this possibility. Hence it is common for each position determination to override all previous determinations in an absolute fashion, or if any note of previous determinations is made, they serve only to alert the reading system to the presence of an error.

In the case of magnetic discs, for example, the synchronization pattern along the track (whether before the sector number data or on the servo surface) must normally be complete and accurate for the sector to be accessible. Any fault in the pattern generally results in the sector being unusable.

Similarly the next frame on magnetic tape drives must be observed within a specified period since the last or an error is reported, so that a systematic error in frame positioning such as an incorrect density cannot in general be accommodated.

Such position determination processes as used in the conventional computer context may well be best suited to read/write media. When applied to a read only medium whose production is carefully controlled, such as the optically readable media with which this invention is primarily concerned, they suffer excessive sensitivity to faults arising from spot obliteration such as by dust, medium nonuniformity etc. Reverting to the example above, a single bit fault in the synchronization pattern on a magnetic disc is sufficient to render the entire sector which follows unusable. When a medium is subject to a high number of such spot faults, a new approach needs to be taken to ensure accurate position determination so that local faults or "spot errors" in synchronization markers or patterns, or other position indicators, are distinguishable from more serious system deficiencies and do not render whole segments of data unread or unreadable.

SUMMARY OF THE INVENTION

Correcting for Fractional Misregistration

In accordance with a first aspect of the present invention, it is proposed to overcome fractional misregistration by a compensation technique entailing manipulation of the initial detector values, in most cases without attempting to achieve actual registration.

More particularly, the invention provides in its first aspect a method of reading information stored in a medium as multiple machine readable record entries arranged in frames which are themselves arranged in one or more channels, which record entries are indicative of values from a limited set of possible values. Each frame is observed in turn with a substantially known array of detector elements each having a limited field of observation such that each record entry is at least partly within the field of observation of at least one detector element, and such that each detector element responds to each record entry within its field of observation in relation to the fraction of the record entry within the field of observation. In this way, there is produced a first set of observed values for each frame represented by the states and/or outputs of the detector elements.

Both the limitations on the range of the possible values and predetermined manipulations of observed values not equal to possible values are then utilized to derive from the observed values for each frame a set of modified values, each being one of the possible values, indicating record entries of the frame. This deriving step is effective to correct for any fractional misregistration between the record entries and the detector elements.

Corresponding apparatus includes a holder to temporarily support or retain the aforesaid medium, and a substantially known array of detector elements movable relative to the holder. Each of these detector elements has a limited field of observation and in use responds to each record entry within its field of observation in relation to the fraction of the record entry lying within the field of observation. Scanning means is provided to scan each frame with the array such that each record entry is at least partly within the field of observation of at least one detector element to produce a first set of observed values for each frame represented by the state and/or outputs of the detector elements. Deriving means is arranged to receive the respective sets of observed values and to utilize both the limitations on the range of said possible values and predetermined manipulations of observed values not equal to possible values to derive from the observed values for each frame a set of modified values, each being one of said possible values, indicating record entries of the frame.

Synchronization

The technique described above for compensating for fractional misregistration obviates any requirement for achieving actual registration between detector elements and record entries, but does not of itself overcome displacement of the read head with respect to the data by multiples of record entries, nor can it substitute for proper synchronization between the read head and the channels and frames in which the data is arranged in the medium. One approach, somewhat in conformity with the principal aspect of the invention, is to avoid actual registration by identifying one or more marker patterns among the aforesaid modified values, and utilising the marker patterns to derive from the modified values an accurate representation of the record entries of the respective frame being observed, which might itself be characteristically identifiable. Suitable embodiments are described hereinafter and reference is again made in this connection to U.S. Pat. No. 3,795,902 to Russell, the relevant disclosure of which is incorporated herein by reference.

Alternatively, or additionally, synchronization may be achieved by way of special markers in the medium itself, a primary set being associated with the channels of data frames and a secondary, optional, set with the frames themselves. The second aspect of the invention is concerned with a medium arranged in this manner, and with the reading of such a medium for synchronization purposes.

The invention therefore provides in its second aspect an information storage medium in which information is stored as multiple machine readable data entries arranged in frames which are themselves arranged in plural, generally parallel channels. The medium contains machine readable synchronization markers which are respectively positioned at the leading ends of the channels, and preferably also at intervals along the channels, and which include features characteristically located on the medium with respect to the associated channels.

In this second aspect, the invention also affords a method of synchronizing a read head with respect to multiple machine readable data entries arranged in frames which are themselves arranged in plural, generally parallel channels, comprising observing machine readable synchronization markers respectively positioned at the leading ends of the channels, and effecting the aforesaid synchronization by reference to features of the markers which are characteristically located with respect to the associated channels.

Suitable apparatus comprises means to observe machine readable synchronization markers respectively positioned at the leading ends of the channels, and means to effect the aforesaid synchronization by reference to the features of the markers which are characteristically located with respect to the associated channels.

Distinguishing Local Faults in Position Indicators

In the third aspect of the invention, there is afforded a method of observing a succession of machine readable position markers in a medium comprising: observing the markers in turn and storing observed values indicating marker position for a predetermined number of markers preceding each marker being observed; determining whether each observed value is outside a selected trend established by the stored values by more than a predetermined margin; and, if so, reducing the effect of that value.

The selected trend may be initially established by first observing a special marker which is able to be observed with greater confidence in the observation, for example because of repeated observation.

Semiconductor Device

In a fourth aspect, the invention provides a semiconductor device comprising a Field-effect transistor layer which has one major face in electrically conductive contact with a photoelectric or magneto-electric layer and another major face in electrically conductive contact with a juxtaposed conductor layer, and a strip of material in proximity to the gate of the Field-effect transistor layer selected whereby on propogation of a wave in said material a voltage is generated which opens a moving conduction window in the Field-effect transistor layer.

BRIEF DESCRIPTION OF THE DRAWINGS

The invention will be further described, by way of example only, with reference to the accompanying drawings, in which:

FIG. 2A schematically depicts a simple arrangement for reading the fiche shown in FIG. 1;

FIG. 16 is a block circuit diagram similar to FIGS. 7, 8, 12 and 14 for such fifth embodiment;

FIG. 17 is a diagram of a digital circuit for identifying a characteristic pattern in the data of a frame, for compensating for integral misregistration;

FIGS. 18A-18D comprise a single flow chart of a ROM program for the microprocessor of FIG. 5, setting out instructions for reading and analysing a channel synchronization marker;

DETAILED DESCRIPTION OF THE PREFERRED EMBODIMENTS

For the purposes of explanation, the ensuing discussion shall be based upon a number of simplifications. It will be assumed that the medium in which the information is stored is a microfiche, and that such information comprises digital data arranged as equi-spaced record entries in a series of linear record frames in one or more parallel channels. The frames extend perpendicularly to the channels and the record entries are indicative of the binary numbers 1 and 0, these comprising the limited set of possible values. Hence the record entries, which might for example comprise spots of substantially variable opacities, typically translucent and opaque spots, will herein be referred to as bits. It is to be emphasized that none of these simplifications constitute limitations on the ambit of the invention. For example, the record entries might be spots of magnetization or transitions from one value of opacity, or one magnetic field intensity or direction, to another, and a cartesian arrangement of the data, while presently thought to be optimal, is certainly not mandatory.

In a practical microfiche prepared along the above lines, the data may typically be arranged so that each channel is about 500 micron wide and comprises 9 longitudinal segments of about 9 mm each containing 600 frames of data bits. Each frame is 6 micron wide and each spot 6 micron in diameter. The frames are separated by a gap of, say, 9 micron. The microfiche may be, e.g., a silver halide master or a diazo copy thereof.

Figure 1A:
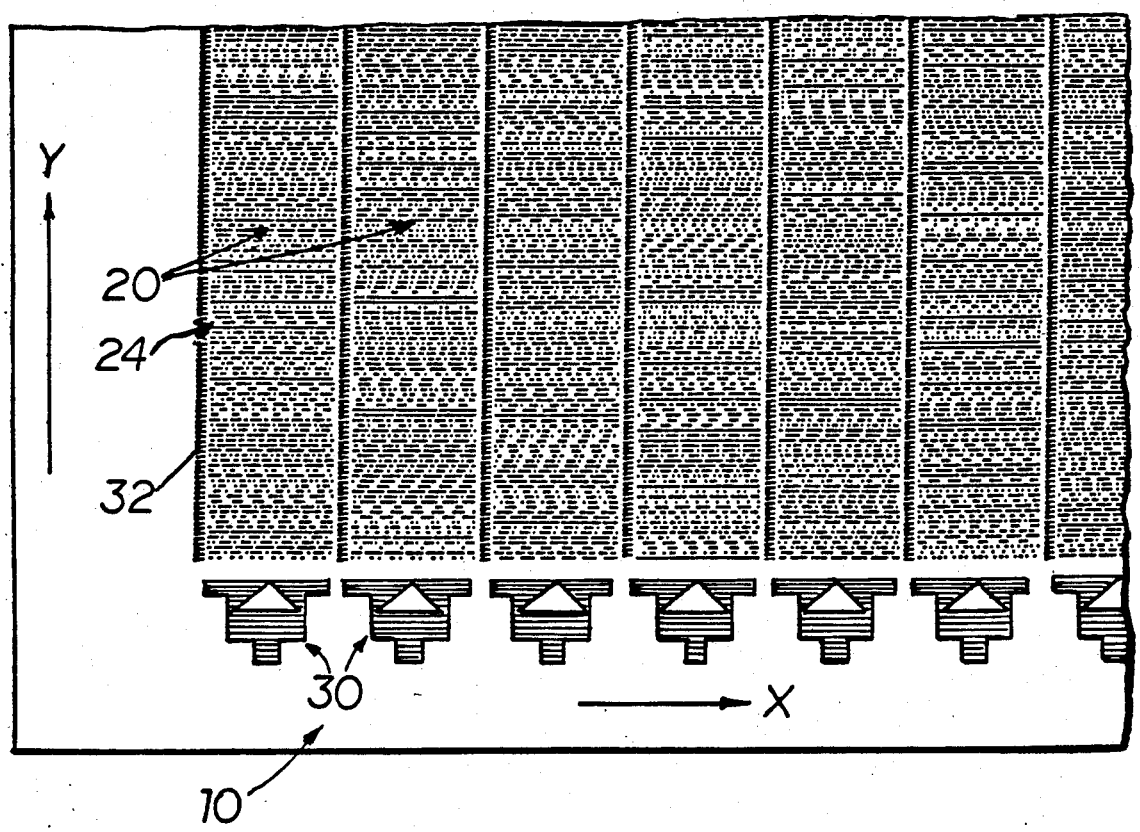
FIGS. 1A and 1B respectively depict in plan a magnified (47×) portion and a smaller further magnified (12×) sub-portion of a microfiche in which information is stored in multiple optically machine readable record entries.
Figure 1B:
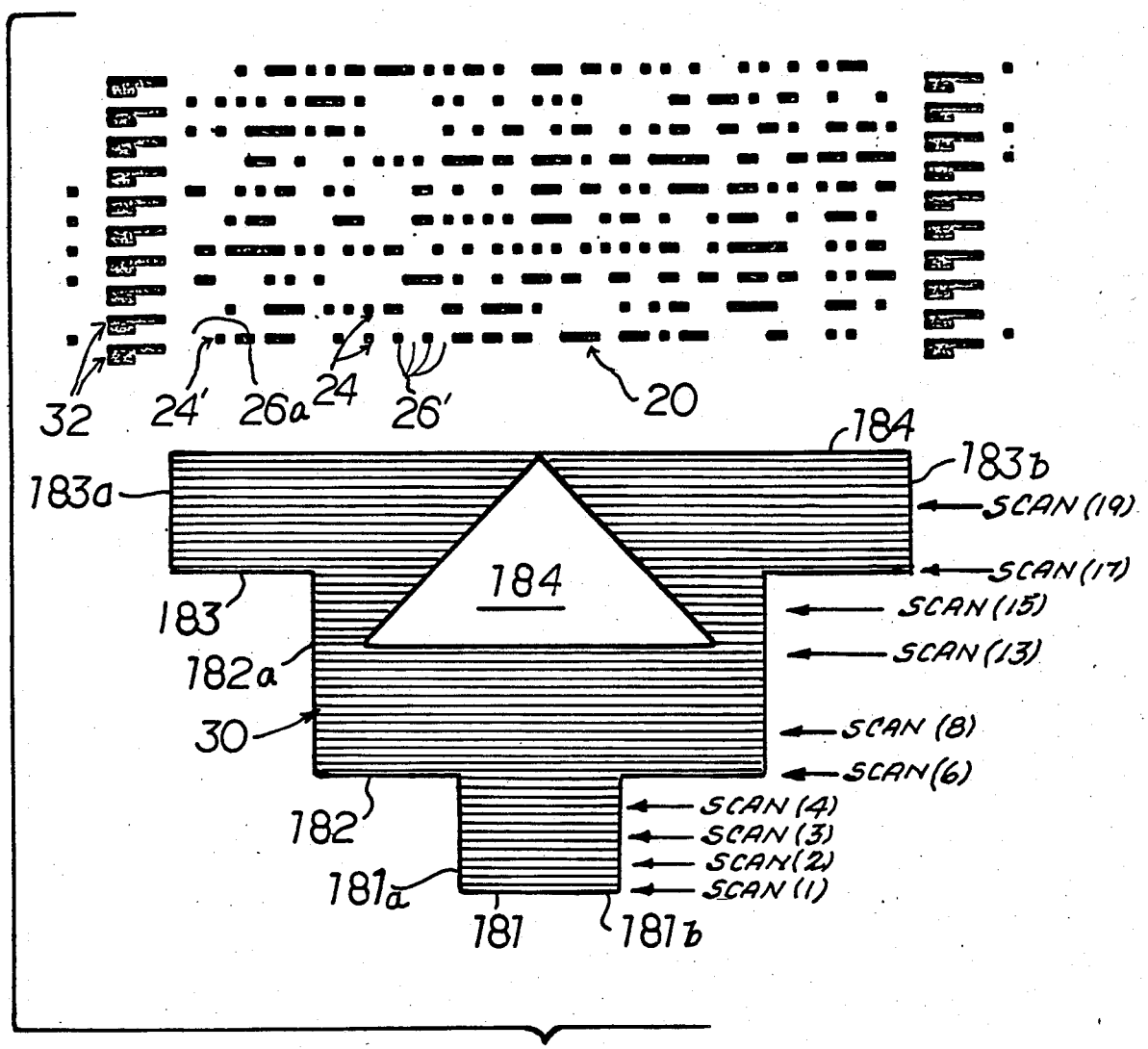

An illustration or photograph of a microfiche thus envisaged cannot be very informative as to detail. FIGS. 1A and 1B respectively illustrate a magnified (47×) portion and a smaller further magnified (12×) sub-portion of a representative fiche 10 on which data bits 26 are arranged in parallel channels 20, each divided into blocks or segments of groups of parallel frames 24. One of the possible values of the parallel bits, say 1, is positively indicated by a translucent "spot", but adjacent spots merge to form translucent bars. The other value, 0 in the example, is indicated by sustained opacity at the regular site for the bit.

The start ends of each channel segment, and therefore also the start of the channel, are preceded by a respective specially configured position indicator in the form of a channel synchronisation marker 30, having certain prescribed relationships to the respective channel segment in accordance with the second aspect of the invention. Each frame 24 is associated, in a prescribed spatial relationship according to a preferred feature of the second aspect of the invention, with its own position indicator comprising synchronisation marker 32. Markers 30 are geometrically similar, as are markers 32. The nature and use of these markers will be reverted to subsequently, being depicted in greater detail in FIGS. 1B and 19 respectively.

Fiche 10 is conveniently read by scanning along each channel in turn with a linear detector comprising multiple detector elements. A single detector might of course scan along each frame and thereby read each data bit in turn but it is much preferred to utilise a linear array of detector elements of span greater than a frame and so simultaneously read all bits of each frame in turn. It is also desirable for the purposes of the first aspect of the invention that each record entry is at least partly within the field of observation of at least one detector element, and that each detector element has a limited field of observation and responds to each record entry within its field of observation in relation to the fraction of the record entry within such field of observation. A suitable such detector is a multiple element photosensitive line image sensor designed for optical imaging at high sensitivity and speed. Such a sensor is typically associated with a charge-coupled device by which the charge state of each element is passed via a transfer gate to analog transport shift registers for storage therein. The thus stored observed values are generally read for analysis so that the time at which a value is read bears a known relationship to the position of the respective detector element along the array.

An example of a commercial detector of this type is the Fairchild CCD 111, manufactured by the Fairchild Camera & Instrument Corporation of Palo Alto, Calif. The CCD 111 has 256 photosensitive detector elements in linear array, each element being of rectangular configuration in the plane of the array.

FIG. 2A schematically depicts a reader arrangement showing the principal components. Microfiche 10 is held in a glass platen 40 which moves from left to right and vice-versa while the illumination and optics assembly 41 (including read head 41a) moves on an axis 42 perpendicular to the paper. The illumination system comprises a bulb 43, a condensing lens 46, a mirror 46a to allow the illumination system to take less space, and filters 47. The light passes through platen 40 and fiche 10 and into a focussing lens 49, thence via another mirror 49a onto the photosensitive detector 44. That detector is served partly by other electronics mounted on the same printed circuit board 48 as the detector, and by other circuits not shown. Detector 44 is mounted to a carriage 45 which is movable for focus adjustment by a manual drive 45a. The whole read head 41a, housing lens 49, detector 44, carriage 45 and drive 45a is mounted at 41b for adjustment to and from platen 40.

Movement of platen 40 and assembly 41 is effected by separate drives comprising respective screw and nut mechanisms each powered by a suitable electric motor. The screw 51a and ball-race nut 51b of the mechanism for assembly 41 are visible in FIG. 2A, which also shows in the left inset the electric motor 53c and screw 53a for platen 40. The axis of screw 53a is of course parallel to but out of the plane of the rest of FIG. 2A.

It will be seen that the two drives are operable to selectively relatively move read head 41a relative to the fiche in either or both of two mutually perpendicular directions, parallel to the channels and parallel to the frames, so that the read head may scan each frame in turn, channel by channel. An alternative drive would be an inelastic wire or band wound around a drum connected to a motor. It is preferred that the drive relatively moves the microfiche at substantially constant velocity parallel to the data channels and perpendicularly to the frames, but in a stepwise motion parallel to the frames and perpendicular to the channels.

In use, the array of detector elements comprising detector 44 is exposed by the optics including lenses 46, 49 to light filtered by each frame in turn and so temporarily stores a charge in each of its constituent elements directly representative of the light intensity on that element from within a defined field of observation for the element determined by the interaction of the element with the optics. The device thus has the aforementioned property, that each constituent detector element responds to each record entry within its field of observation in relation to the fraction of the record entry lying within the field of observation of the respective detector element.

Figure 2B:
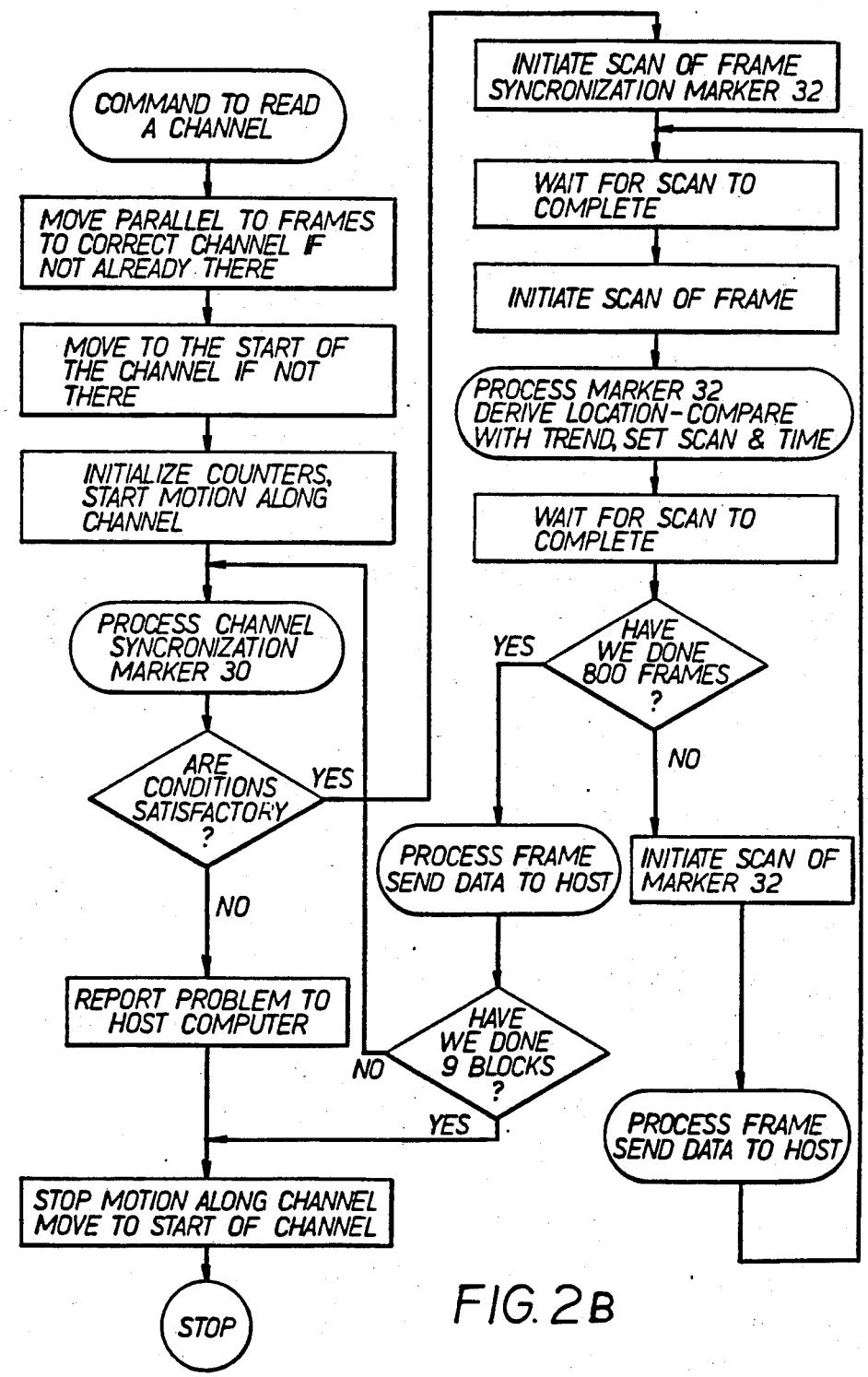
FIG. 2B is a flow diagram for the principal steps in scanning and reading a channel of the fiche.

FIG. 2B is a simple flow chart outlining the sequence of steps executed by the reader arrangement as it scans, reads and analyses the information on the fiche. The first stage of such action will be to position the read head 41a at the start of the desired channel 20, and to start a relative motion of the channel passing under the read head. Next a marker 30 will be encountered. The examination of such markers (which is the subject of a later chapter of this specification and of the second aspect of the invention) will typically involve a number of scans of the fiche by the photosensitive array, yielding the position of the array relative to the channel to a high level of confidence, and the relative orientation of the read head with the channel, the range of detector outputs likely to be observed, and the velocity of the channel relative to the read head. If one or more of these parameters are such that correct data extraction cannot be achieved then the mechanical system will be instructed to move the microfiche to the start of the channel and the problem will be reported to the host (micro) computer.

If conditions are found satisfactory, the read head moves relatively forward and scans the first of the markers 32 and then the first frame of the channel. PROCESS MARKER 32 is the subject of a preferred feature of the second aspect of the invention and is further described below. PROCESS FRAME is the subject of the first aspect of the invention and of the next chapter of this specification.

Figure 3:
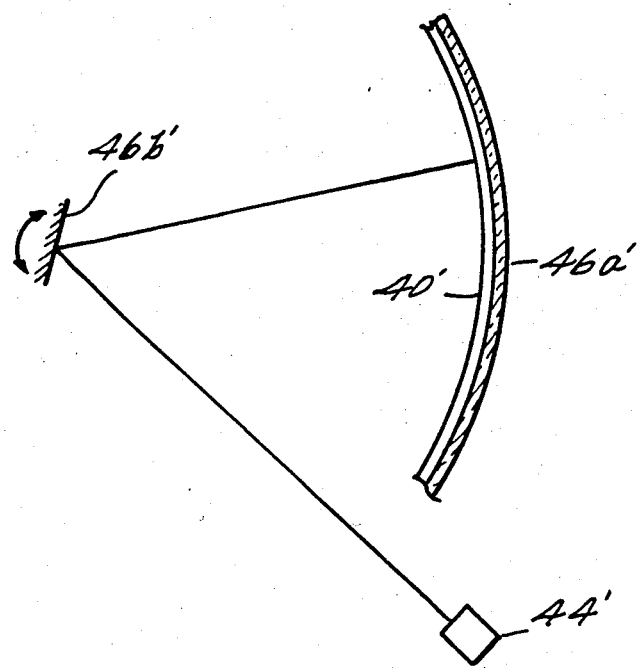
FIGS. 3 and 4 schematically depict respective alternative reading arrangements.
Figure 4:
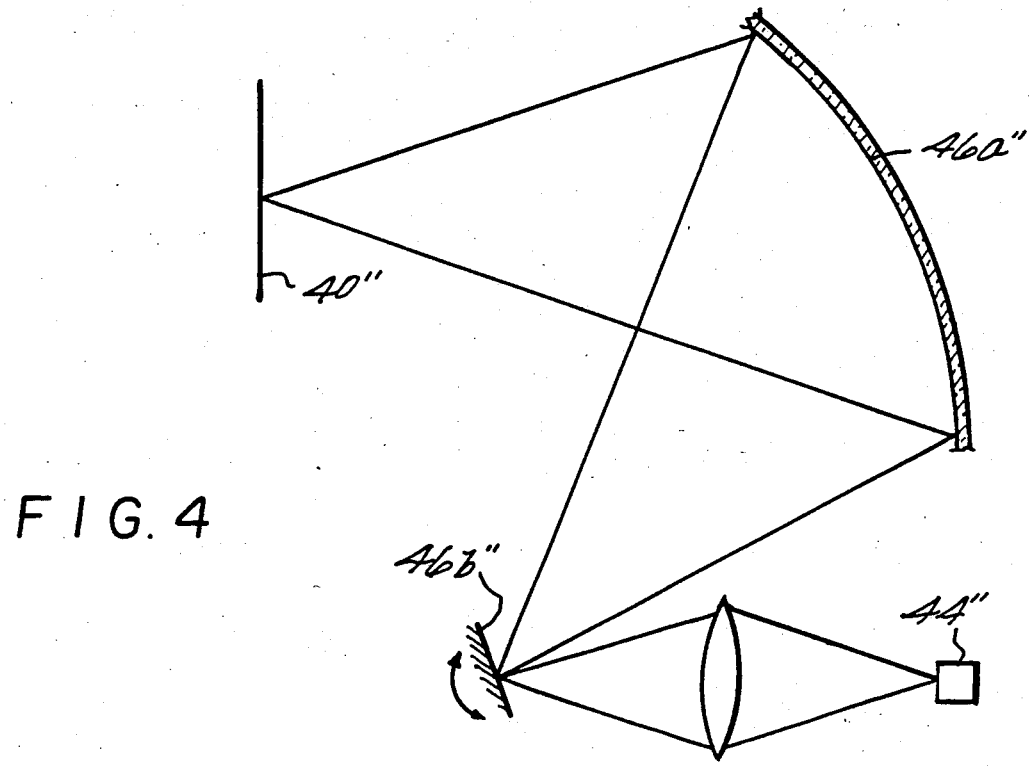

Two alternative scanning techniques, applicable only to optically observable record frames such as in microfiche or microfilm and both utilizing rotating mirrors, are depicted diagrammatically in FIGS. 3 and 4, in which the like parts are indicated by like reference numerals. In the FIG. 3 arrangement, a cylindrically curved mirror 46a' is disposed so that a selected record frame of a medium in a holder 40' lies on the face of the mirror 46a'. Mirror 46a' is either stationary (as it might be with microfilm) or is movable in a direction parallel to its axis of curvature (as it might be with microfiche). A further mirror 46b' is mounted substantially at the axis of curvature of cylindrical mirror 46a' for rotation about an axis parallel to the axis of curvature of mirror 46a'. In this manner, optical paths are successively provided between the record frames of a channel and an array of detector elements 44'. Mirror 46b' might sweep over the angle subtended by the medium at the axis of the rotatable mirror. Mirror 46b' would typically sweep up and down in a simple harmonic or linear fashion so that all frames in each channel could be observed.

In the FIG. 4 arrangement, a spherical or paraboloidal concave mirror 46a'' is disposed to face the record frames of the medium in a holder 40''. A further smaller mirror 46b'' is mounted substantially at the focus of concave mirror 46a'' for rotation about at least one axis. Mirror 46b'' may rotate about both of two perpendicular axes: rotation about one axis permits selection of each channel in turn while rotation about the other axis would cause light from successive frames of the selected channel to fall on a stationary optical detector array 44''.

A particular application of the latter scanning arrangement would employ a stationary spherical mirror of a circumference slightly larger than $\sqrt{W^2+(L/2)^2}$ where W and L are respectively the width and length of the microfiche constituting the storage medium. The radius of curvature of this mirror would be selected in accordance with dimensions of the reading equipment and with resolution or depth of field criteria. The circumference of the mirror would lie in a plane parallel to the plane of the microfiche, which would be held against another flat mirror. The microfiche is then positioned so that the axis of the stationary spherical mirror does not pass through the microfiche, but all light rays passing therethrough in a direction perpendicular to its surface would strike the stationary spherical mirror. The rotating mirror, at the centre of focus of the stationary mirror, can then direct a light beam if intersected onto any part of the microfiche, while light rays from any particular part of the microfiche can be redirected by the moving mirror to a stationary detector. Since a large portion (almost half) of a stationary spherical mirror would not be used, such part could be omitted.

Correcting for Fractional Misregistration

A principal task of electronics 48, in accordance with the first aspect of the invention, and by way of execution of the task indicated by PROCESS FRAME in FIG. 2B, is to correct for any misregistration between the bits and the detector elements. As discussed, one form of such misregistration is fractional misregistration, in which at least some of the detector elements are positioned to observe more than one of the bits. It is this aspect of the invention which will now be discussed in detail. Essentially, it is proposed to utilize both the known limitations on the range of possible values and predetermined manipulations of observed values not equal to possible values to derive from the observed values for each frame a set of modified values, each being one of the possible values, indicating record entries of the frame. In the particular case at hand, the "possible values" are limited to the binary numbers 1 and 0.

First Embodiment

According to a first embodiment of this aspect of the invention, outputs from successively positioned detector elements are successively presented at regular intervals. The aforementioned modified values, while being restricted to values representing only the possible values 1 and 0, are produced at times which vary from the times of presentation of the detector element outputs in a way which reflects the magnitudes of the detector element outputs. The method relies on the fact that a detector element observing part of a bit, typically a spot(s) or transition, will have an output lower than one observing a spot centrally or observing a continuous section where a particular degree of opacity prevails. If that lower output is converted to a delay, from the time when that detector element output is presented to the time when the output changes from a 1 to a 0 or vice versa, then a smaller number of detector elements per bit can be used. Transitions from 1 to 0 are delayed in proportion to the difference between the leading detector element output and that corresponding to a 0, and transitions from 0 to 1 are delayed in proportion to the difference between the leading detector element output and that corresponding to a 1.

Figure 5:
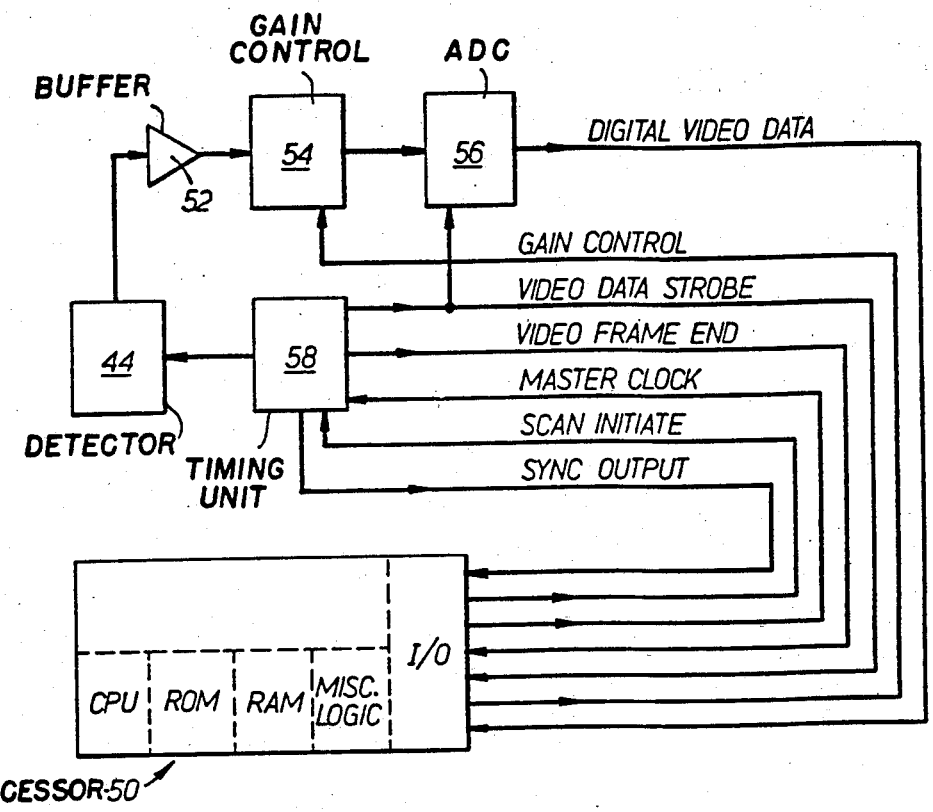
FIG. 5 is a block circuit diagram of an arrangement for practising the first aspect of the invention under microprocessor control.

This embodiment, like all others to follow, may be carried out by wholly digital/logical analysis, for example under the supervision of a microprocessor controller suitably programmed in ROM or as a hardwired logic circuit equivalent to the microprocessor program. FIG. 5 is a diagram of the circuit layout, which is a substantially standard configuration according to well-established principles of microprocessor control.

The microprocessor itself 50 has the usual constituents: a CPU, for example a M6809, ROM and RAM modules, examples being 2732 and 6116, and an I/O interface such as 6522 V1A. Raw analog data from the photosensitive charge-coupled detector 44 is fed via a buffer 52 and level shift/clamp and gain control 54 to a 4-bit analog-digital flash converter (ADC) 56, then to microprocessor 50. Microprocessor 50 generates a master clock signal which initiates each scan by the read head, and during the scan the regular successive presentation of the outputs resulting from the previous scan. A timing unit 58 comprises a simple set of counters (for example Motorola LS197), with a pulse generator which generates the pulses required for each output from a quartz crystal in any of the usual fashions. The respective control timing signals output and input to processor 50 are indicated in FIG. 5. In this arrangement, the binary digits representing the output of each detector element will be stored in successive memory locations by direct memory access during the read out of the currently stored frame scan. When this process is complete, the microprocessor will examine the output values in order to extract the binary values stored on the medium. A flow chart for the first embodiment of this process is set out in FIG. 6.

The flow chart assumes that a symbol VMAX contains the maximum possible size of a detector element output, that the actual detector element outputs have been digitized and stored in the array VAR, and that NDMAX contains the number of such elements. The flow chart loops over successive elements. The process of correcting for fractional misregistration computes transition times in units equal to the time between the presentation of the outputs of adjacent detector elements and sets the variable OP to the appropriate binary value at the end of the time allotted to each detector element (each unit of time).

Figure 6:
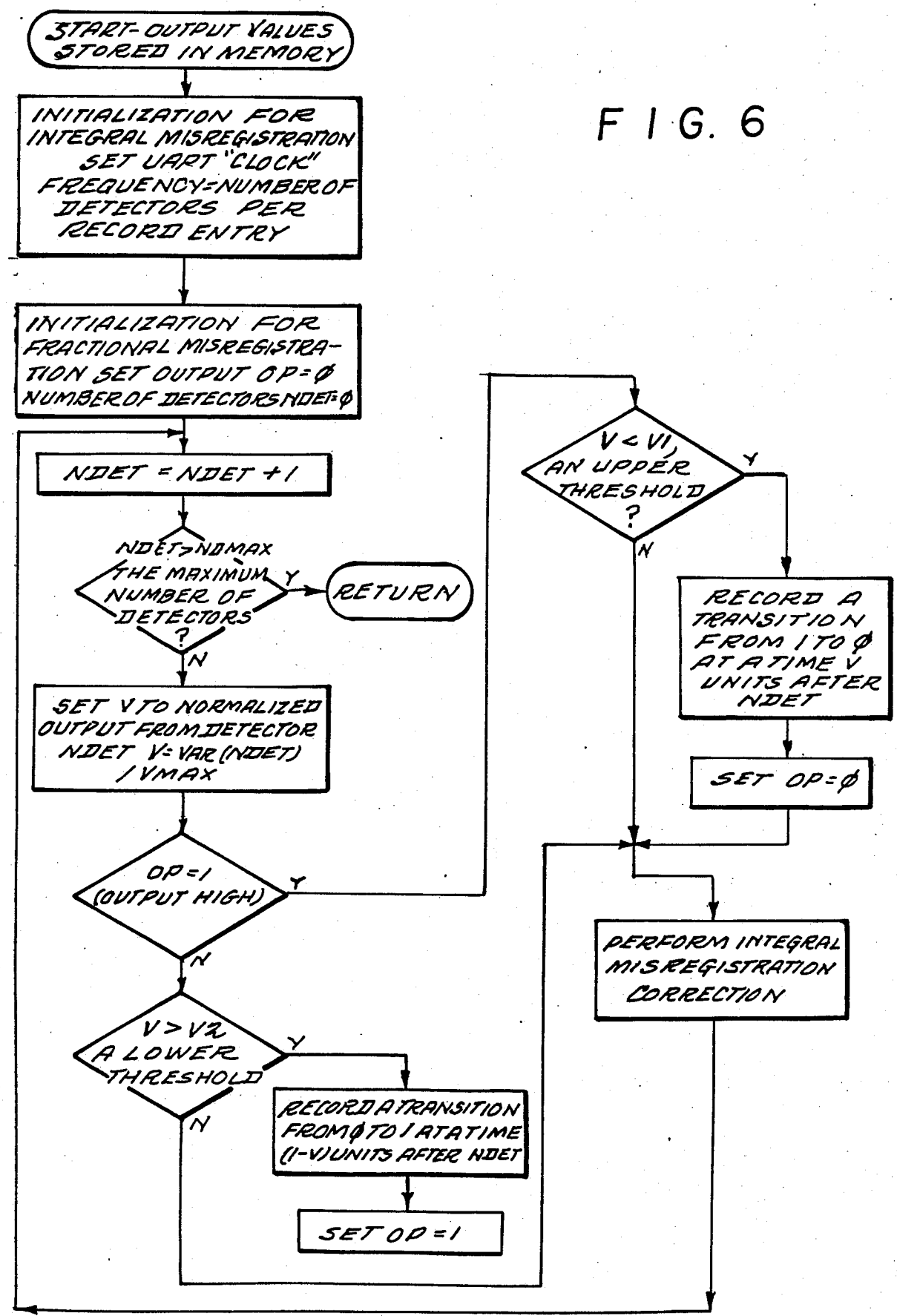
FIG. 6 is a flow chart for a digital microprocessor executed version of the first embodiment of the first aspect of the invention.

The flow chart of FIG. 6 also includes a final step to correct for integral misregistration: this is the subject of more detailed discussion hereafter.

It will be seen that the sequence of FIG. 6 obeys the following rules:

(a) If the output was low, corresponding to a 0 bit and the next detector element observed shows an output somewhere between the lowest and highest outputs, then produce a transition from a 0 to a 1, at a time after the output presentation proportional to the difference between the highest output and the output observed The constant of proportionality should be such that an output or observed value actually at the lowest level (corresponding to a 0) would produce a delay at least until the next observed value was presented, at which time the circuit would be reset.

(b) If the output was high, corresponding to a 1 bit, and the next detector shows an output between the highest and lowest outputs, then delay the transition to a 0 for a time proportional to the difference between the observed output and the lowest output. The constant of proportionality would be the same.

Figure 7:
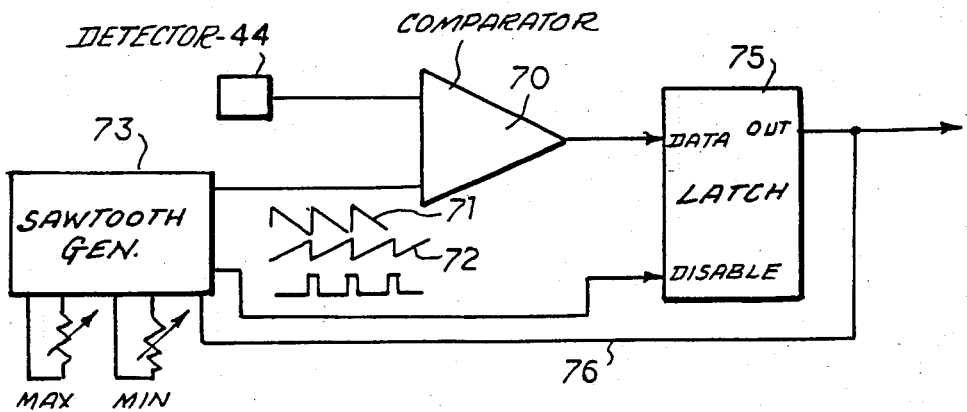
FIG. 7 is a block circuit diagram of apparatus for compensating for fractional misregistration according to a first embodiment of the first aspect of the invention.

FIG. 7 illustrates in block form a circuit for an alternative approach utilizing analog analysis by direct comparison at 70 of the detector output with alternate waveforms 71, 72 derived from a sawtooth generator 73. By superimposing, on the output, regular sawtooth waveforms having a slope of uniform magnitude and maximum and minimum values corresponding to the highest and lowest possible values (1 and 0), the position of each intercept on the slope constitutes the desired time representative of the output magnitude. Each intercept is thus employed to invert the output of comparator 70 and, per feedback 76, to invert the slope of the sawtooth waveform at the next turning point of the waveform so that generator 73 produces the other sawtooth waveform. The output of comparator 70 is high when the detector voltage is higher than the sawtooth voltage. The output is fed through a latch 75 which is disabled during the fly back part of the sawtooth by a pulse from sawtooth generator 73, thereby preventing possible race conditions during this interval.

Figure 8:
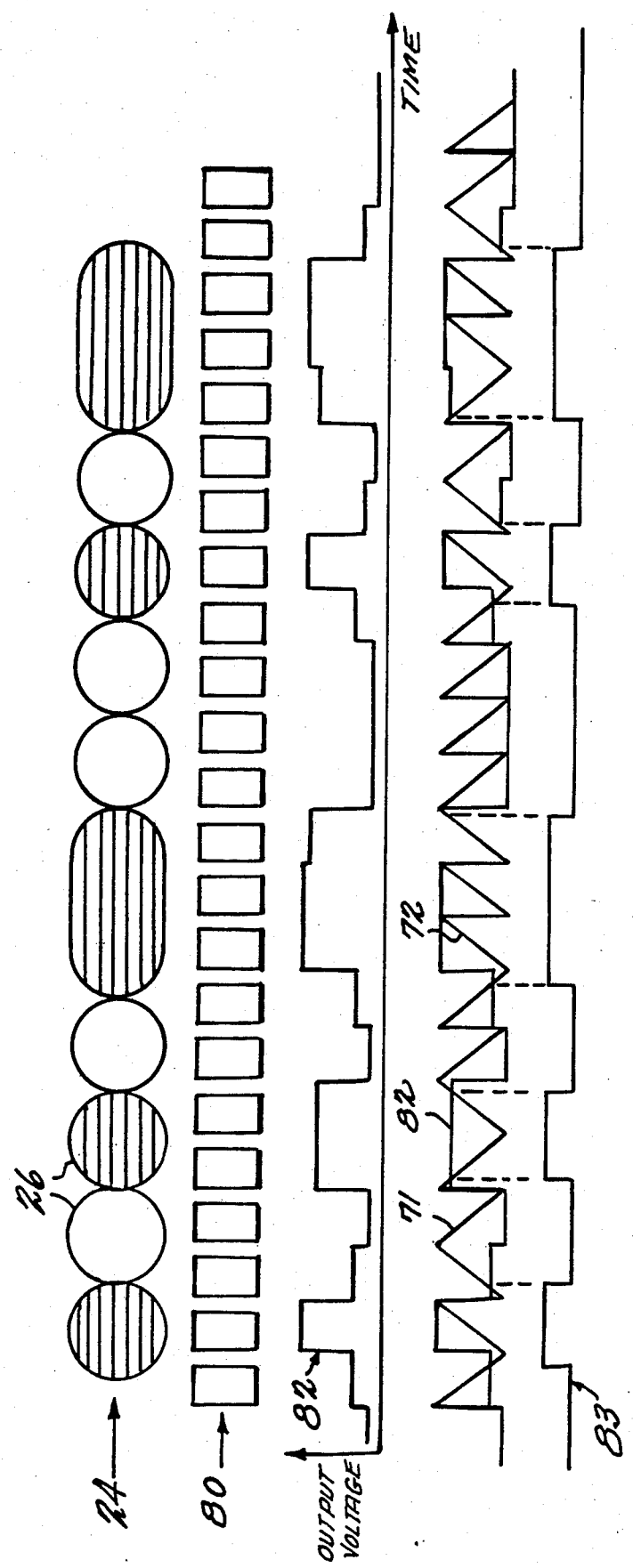
FIG. 8 is a diagram representing part of a frame of record entries, a corresponding portion of an array of detector elements positioned to observe the frame, and related waveforms for the observed values and for the modified values derived in accordance with the first embodiment of the first aspect of the invention.

The resultant derivation is illustrated schematically in FIG. 8. FIG. 8 shows a simple frame 24 of data bits 26, in this case represented by two well distinguished degrees of opacity in a format similar to that described earlier with reference to FIG. 1. The linear array 44 of charge-coupled detector elements 80 of the type described is brought to an observation position—it will be noted that the spacing of the detector elements is less than that of the bits but that there is no integral ratio involved, and that each bit is at least partly within the field of observation of at least one detector element. Detector elements 80 are shown below frame 24, drawn to scale after correction for optical magnification. The set of observed values is depicted as output waveform 82. The horizontal axis below the waveform represents time, but because the detector elements are serially clocked out at a regular rate, as previously described, it also corresponds to the position of the detector element producing the voltage shown.

That same voltage waveform 82 is drawn below, in FIG. 8, with sawtooth waveforms 71, 72 superimposed upon it. Initially the saw tooth waveform 71 has a negative (descending) slope which persists until the sawtooth waveform crosses the detector output waveform 82, at which point the waveform slope reverses by virtue of feedback 76. The last waveform 83 is FIG. 8 depicts the end-result of having thus applied the derivation rules outlined above through the device of comparing waveform 82 with the alternative waveforms 71, 72. It will be seen that these "modified values" comprising waveform 83 accurately represent bits in the frame. A similar result is of course achieved with the digital technique described with reference to FIGS. 5 and 6.

Second Embodiment

According to a second embodiment of that aspect of the invention concerned with correcting for fractional misregistration, the states of the charged-coupled detector elements are again read serially so as to produce a time based digital signal comprising a set of observed values. These values are directed into a communications interface, such as a Universal Asynchronous Receiver Transmitter (UART), wherein modified values representing the bits of the respective frame are derived by an analysis, known per se, which require there to be several detector elements per record entry, for example 3 or 4 detector elements per record entry. The basic clock frequency Fu provided to the UART must be equal to or nearly equal to that given by $FU = Fd/N$ where Fd is the frequency at which successive detector elements are presented, and N is the number of detector elements per record entry. Note that N need not be an integral number. The UART will then test the output of a detector element near to the centre of each record entry in response to the UART clock running at frequency Fu. This clock would be started by the observation of a transition from one binary record entry value, say 0, which had persisted for an appropriate length of time, to the other such value. This transition will be represented by a small number of detector element outputs midway between the two extremes and would be best registered as occurring at the point where the rate of change between successive outputs is greatest. One method of obtaining this optimal detection of the transition would be to use a low pass filter such as that provided by a series resistor followed by a capacitor to ground to reduce the importance of the clocking of detector elements while retaining all the frequencies associated with transitions from one record entry to another, i.e. the filter would pass frequencies of say 3 times Fu, but not those as high as 3 times Fd. The output of such a filter would be used as input to a threshold sensor such as a Schmidt trigger which would start the clock when the filter output signal was half way between the extremes or at a level equal to the lower extreme plus 0.6 times the difference between them The UART detects the start of a character comprising several 1 bits and polls the digital signal at times corresponding to the midpoint of bits in the character, thereby determining modified values equal to the bit values (dependent on the input voltage at the sample time) and then presenting all 8 bits at once.

Hence, in this embodiment, electronics 48 of FIG. 2A includes a UART for signal analysis. A suitable single chip UART is the INS8250 chip manufactured by National Semiconductor.

Figure 9:
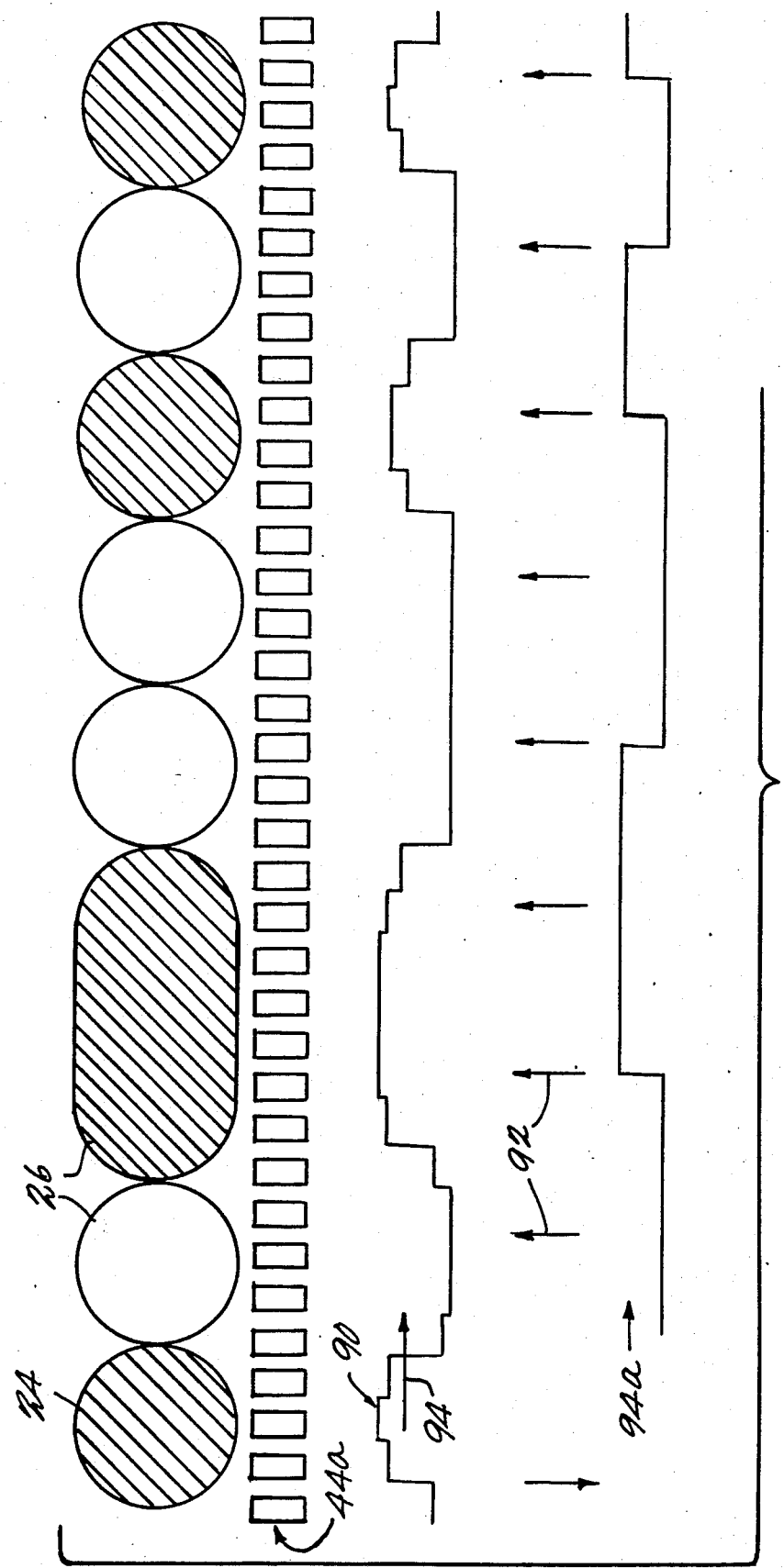
FIG. 9 is a diagram similar to FIG. 8 for a second embodiment of the first aspect of the invention.

FIG. 9 depicts the sequence of steps performed by the UART. Part of a frame of record entries or data bits is shown at 24, the corresponding array of charge-coupled detector elements at 44a, drawn to scale (after correction for optical magnification) below the frame. The output 90 from the detector elements is drawn on an axis which is on the one hand the distance along read head 44a (for a match with the detector elements drawn above), and on the other hand time since those elements are serially clocked out at a constant rate.

The arrows 92 indicate the start of the bit sampling sequence (down arrow) and the times when the 8 data bits are sampled (up arrows). Whenever the signal is above the 60% level indicated by the arrow 94, the signal is taken as a 1, otherwise it is taken as 0. The 1s and 0s resulting from the sampling are shown in time sequence at 94a below.

Figure 10:
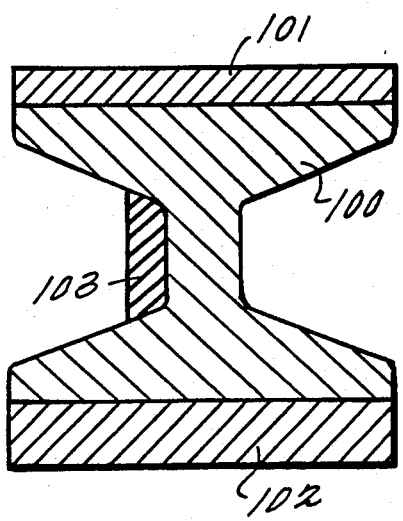
FIG. 10 is a cross-section of a semi-conductor device according to the fourth aspect of the invention.

In an alternative form of this second embodiment, read head 44a is configured to continuously output an analog rather than a digital signal. A novel semiconductor device to serve as a transfer gate for this purpose is depicted in cross-section in FIG. 10. A Field-effect transistor layer 100 is sandwiched between, and in electrically conductive contact at respective major faces with, a continuous linear detector 101 and a conductor layer 102. A strip of piezo-electric or like material 103 is disposed in proximity to the lengthwise extending gate of layer 100, so that, on propagation of a wave in material 103, a voltage is generated which opens a moving conductive window in the Field-effect transistor layer 100. Thus the detector in this case can be viewed as being divided into an infinitely large number of uniform but infinitely small detector elements which comprise segments of the detector arranged so that the values observed by each segment can be output separately from the values observed by other segments.

In a further variation of this second embodiment, the voltage signal from the semiconductor device would be differentiated and rectified before being passed to the UART. Thus, any change, e.g. from low opacity to high opacity or vice versa, would result in a 1 bit, while the absence of such a change would correspond to a 0 bit.

Third Embodiment

A third embodiment for correcting for fractional misregistration is applicable to static or parallel observations, in which the outputs of all the detector elements of the array are simultaneously available. It may also be used where detector elements are presented serially, provided the outputs corresponding to any one exposure may be presented in sequence starting at either end of the array of detector elements For this method, the possible values for each record entry are specifically the binary numbers 1 and 0, the centre-to-centre spacings between detector elements and between data bits, as presented to the detector elements, are equal and uniform, and the bit spacing is preferably an integral multiple (including $n=1$) of the detector element spacing. The set of modified values representing the record entries is derived in part by carrying intermediate values substantially different from the maximum and minimum detector element output values, for addition to other intermediate values which are yet to be considered by the electronic system. Thresholds are used to separate the intermediate values from such maximum and minimum values normally obtained when detector elements are positioned near the center of record entries. Important components of this method are tests to ensure that values are being carried in the correct direction, e.g. from detector elements to others nearer the left end of the detector. The correct carry direction depends on the detail of the position of the record entries with respect to the detector elements, but can be identified by tests such as determining whether or not that the carried value is less than the value to which it is added.

Figure 11:
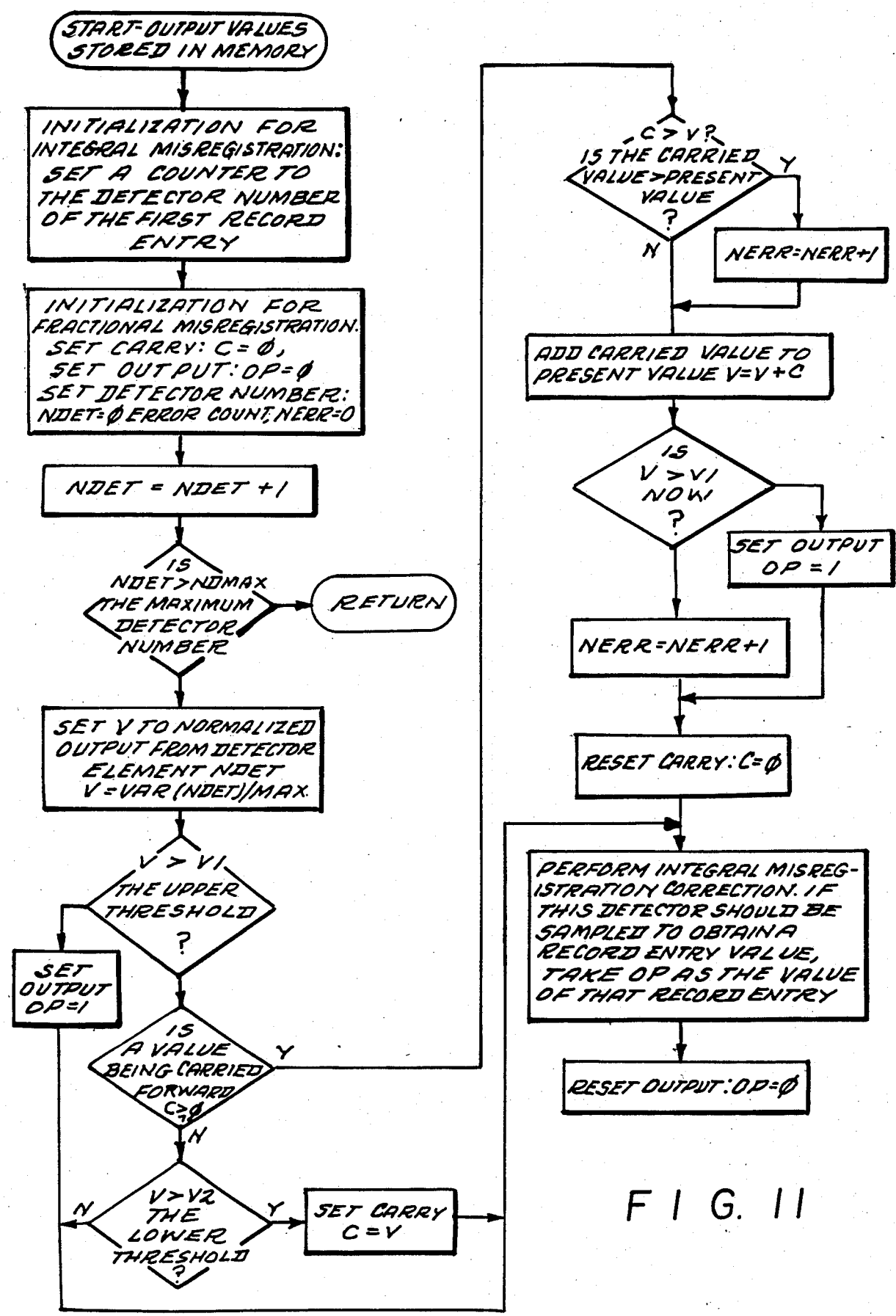
FIG. 11 is a flow chart of a digital microprocessor executed version of a third embodiment of the first aspect of the invention.

The circuit configuration of FIG. 5 can also be employed to apply the above principles and so perform this third embodiment, after the manner set out in the flow chart of FIG. 11. The flow chart describes code which is executed when binary numbers representing the output values for NDMAX detector elements are stored in an array VAR in memory. It shows only a single direction of scanning the detector outputs, namely that of increasing memory address, but replacing "NDET=0" with "NDET=NDMAX+1", and "NDET=NDET+1" with "NDET=NDET−1" would provide the reverse scan. Once the normalized output value V is obtained, the flow chart shows three tests which identify the observation of an intermediate value whilst no other such value is being carried, in which case the said value is carried. Whilst such a value is being carried it is compared with any subsequent intermediate value and if found to be larger than the subsequent intermediate value the error count NERR is incremented. At the end of the loop shown this error count would be compared with error count obtained by the reverse scan, and the results of the scan with the lowest error count (which would be expected to be zero) would be taken as the values determined. The error count is also incremented if an intermediate value remains less than the higher threshold after the carried value has been added to it. The integral misregistration correction might be achieved by counting detectors and sampling those nearest the middle of record entries.

A particular implementation of the derivation method according to this third embodiment can be used to illustrate the operation of the method. Suppose an optical medium such as microfilm or microfiche is used to store bits in the general format already described, and that each bit is represented by a spot. Suppose further that a transparent spot providing light to a detector represents a 1 bit, while opacity represents a 0 bit.

If the medium is misregistered with reference to the detector elements by half the spacing between spot centres, and this spacing, as presented to the detector elements, equals the detector spacing, each detector will observe two halves of two adjacent spots. Then a bit sequence along a frame of 001001110 will result in detector outputs (observed values) of 0,0,.5,.5,0,.5,1,1,.5 if the maximum detector output is adjusted to be 1. The analog carry of the first 0.5 value will be to the adjacent 0.5 value and will result in a one bit being observed in the 4th detector element assuming carry is to the right (increasing number of detector elements). However, the carry of the 6th detector element will be to the 9th element, resulting in a 1 bit in that position. Thus detector elements 4, 7, 8 and 9 will record 1 bits. A carry in the opposite direction would result in detectors 3, 6, 7 and 8 recording 1 bits.

Figure 12:
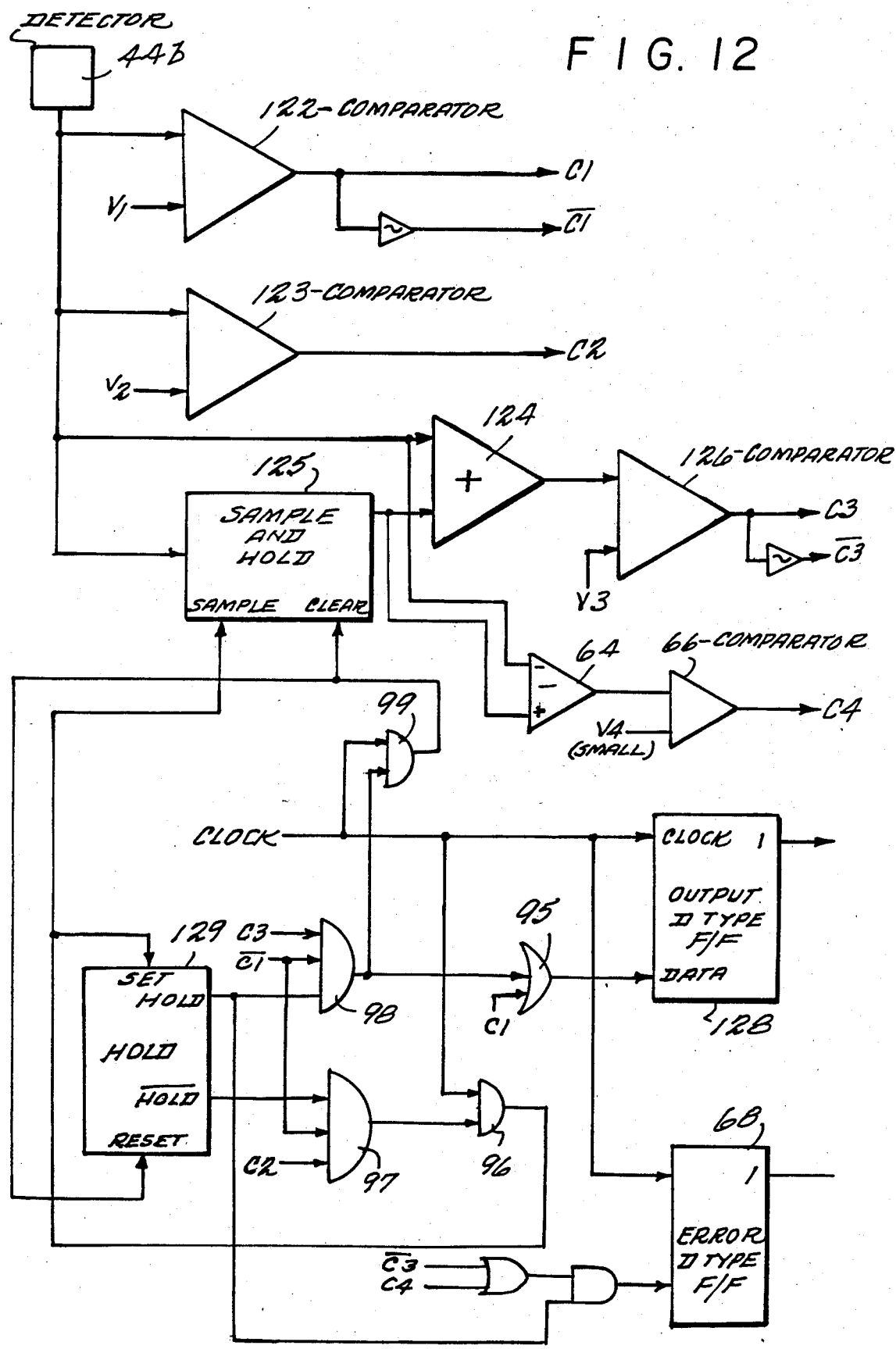
FIG. 12 is a block circuit diagram of apparatus for compensating for fractional misregistration according to a third embodiment of the first aspect of the invention.
Figure 13:
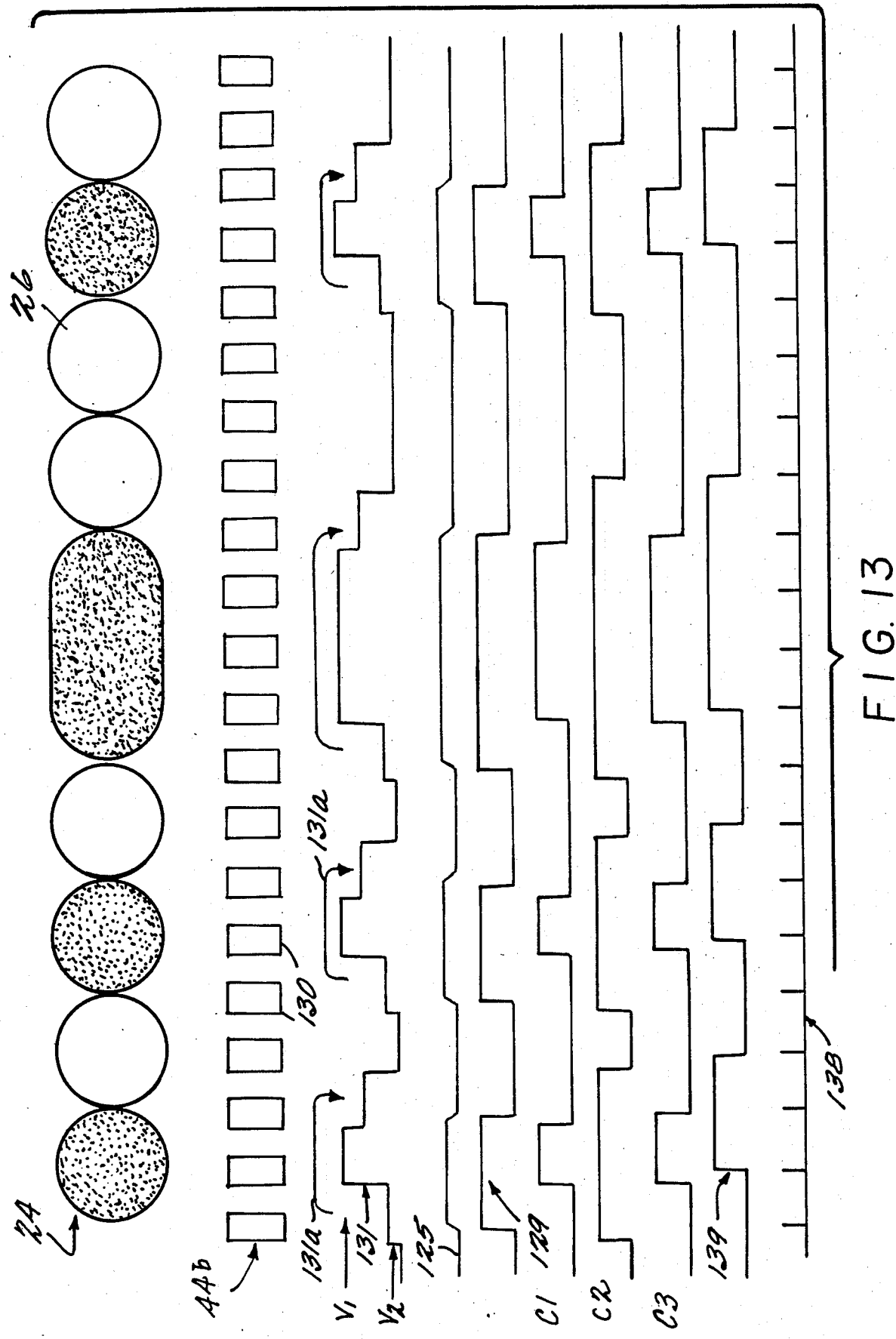
FIG. 13 is a diagram similar to FIGS. 8 and 9 for the third embodiment, but additionally depicting waveforms at various locations in the circuit of FIG. 12.

FIGS. 12 and 13 respectively comprise an alternative analog/digital logic circuit 120 for carrying out the third embodiment of the first aspect of the invention, and a schematic waveform diagram which assists in explaining both the principles of the embodiment and the operation of the circuit. The location in FIG. 12 of certain waveforms shown in FIG. 13 is indicated by way of corresponding reference numerals. With reference firstly to FIG. 13, the numeral 24 indicates a frame of record entries or bits 26 on the fiche, after magnification by the optics, in the same scale as the observing read head 44b of charge-coupled detector elements 130. In this case, it will be observed that the spacing of elements 130 is exactly half that of bits 26. The outputs of read head 44b and of circuit 120 are respectively shown at 131, 139. An important point, which will be readily appreciated by comparing waveforms 131, 139, is that each detector element output may not necessarily be added to the adjacent output, but may be carried to an output several positions away. This carry and add operation, highlighted by arrows 131a above waveform 131, is done when the adjacent detector element has an output substantially corresponding to correct registration with the bit, or when two bits whose values correspond to high outputs are both observed by the next, or subsequent skipped, detector element.

Circuit 120 is such that the derivation of the correct frame representation obeys the following rules:

(a) Where a detector element has an output below the aforesaid first threshold, ($V_1$ in FIG. 13 and at comparator 122 in FIG. 12), generally significantly below the usual maximum output, then that output should be carried forward for addition to the output of a subsequent detector element. The output is in practice stored in a sample-and-hold 125 (FIG. 12).

(b) The detector array is then scanned in one direction for another detector element whose output is below another but similarly valued threshold. The carried output is then added to that of the second detector element at 124 and applied via an AND gate 98 to set an output flip-flop 128.

To minimize the errors due to small random variations in signal size, a further three rules can be employed in the case where the number of detector elements per record entry is an integer:

(c) This process must be applied to both directions to yield the greatest possible lattitude with threshold settings and detector sensitivities.

(d) Where the carried value exceeds the output value to which it is added by a determined threshold, the carry direction is incorrect, and the other carry direction should be chosen.

(e) Where a sum of two detectors exceeding a minimum threshold is made, and does not exceed the aforesaid first threshold $V_1$ established to identify a one bit, or a 0 bit if high output values correspond to 0s, then this indicates that the carry direction used to generate the sum is incorrect, and the other carry direction should be chosen.

Where the number of detector elements per record entry is not an integer, then the selection process inherent in the method of the third embodiment needs to be accurate, especially if the number of detectors per record entry is a small number somewhat less than 2, e.g. 1.5.

If, in the detailed numerical example given earlier, the misregistration is less than half the spacing between spot centers, then values such as 0.8 and 0.2 would be observed. The possibility, due to variations in gain, arises that a 0.8 value may exceed the carry threshold, and be identified as a 1 value in its own right, rather than being carried forward to be added to a subsequent 0.2. This would result in a bit being misplaced. Rule (d), supra, eliminates this possibility.

The circuit of FIG. 12 will now be described in some detail. The output of the detector element array is compared with threshold $V_1$ in comparator 122, and a minimum greater-than-noise threshold $V_2$ (FIG. 13, waveform 131) in a comparator 123. It is also directed to a sample-and-hold 125 and, together with a conditional output of sample-and-hold 125, to the inputs of analog adder 124. A comparator 126 compares the output of adder 124 with $V_3$, set typically at about 75% of the maximum output.

The outputs C1, C2, C3 of comparators 122, 123, 126 and the output complement $\overline{C1}$ of comparator 122, are fed to a series of AND gates 99, 98, 97, 96 and an OR gate 95 comprising digital logic for setting and resetting hold flip-flop 129, sample-and-hold 125 and an output register 128 whose contents comprise the output signal 131 (FIG. 13) of "modified values". Gates 99, 96, are used for timing purposes. Clock pulses (138 in FIG. 13) are produced a short time (0.1 microsec or less) after each detector output is presented to comparators 122, 123, the analog adder 124 and sample-and-hold 125.

The voltage stored in the sample-and-hold 125 rises to the level of the detector output 131 when that level exceeds $V_2$ but is than $V_1$, and falls to zero when the sum of the sample-and-hold output and the detector output exceeds $V_3$. Hold flip-flop 129 is set whenever sample-and-hold 105 is storing a voltage.

Circuit 120 operates as follows, with reference to the detector bit relationship shown in FIG. 13. When the first detector element output appears, it is sufficient to make the comparator 123 output C2 true but insufficient to make C1 true.

Since HOLD is false (no signal is being held) signals to the AND gate 97 ($\overline{HOLD}$, $\overline{C1}$, C2) are all true.

When the clock signal appears it will cause the output from the AND gate 97 to be gated by AND gate 96 onto the set input of the hold flip-flop 129 and to the sample input of the sample-and-hold 125 (The possibility of race condition caused by the setting of hold flip-flop 129 making HOLD false before the signal has had time to request a sample, or properly set HOLD is recognized —delay circuits have been omitted for simplicity.)

The next detector element presents a voltage which exceeds $V_1$, so that $\overline{C1}$ is false, and no AND gate connected directly to the hold flip-flop can have all its inputs true. However the C1 signal presented to the OR gate 95 causes the output flip-flop 128 to be set to a 1 when the clock signal appears.

The third detector element presents a voltage much larger than the first, but less than $V_1$. It is assumed to be large enough so that when added to the voltage of the first detector now being put out by the sample-and-hold circuit 125, it exceeds the reference level of the third comparator 126, making signal C3 true. Thus the signals HOLD, C1 and C3 are all true and hence the AND gate 98 provides a true output signal which is gated 99 by the clock signal to produce the signals to reset the hold register 129, clear the sample-and-hold 125, and set the output flip-flop 128.

Besides the adder 124 and its comparitor 126, there is a subtractor 64 and a comparitor 66, producing a signal C4. This signal is true whenever the output from the sample and hold 125 exceeds the detector output signal.

If either C4 is true or C3 is false, and hold is true then an error flip-flop 68 is set. The C4 condition corresponds to the case where the carried value stored by the sample and hold 125 exceeds the value to which it must be added (rule d). This condition should arise only when sample and hold 125 is holding a value. Certainly if it occurs at other times then it does not have the implication that the scanning direction is false.

The $\overline{C3}$ condition corresponds to the case where sample and hold 125 is maintaining a value, waiting for a value below the "high level" threshold $V_1$ to which to add the held value, and a detector output is observed which when added to the held value produce a sum which is below the threshold of comparitor 126. Normally this sum is well in excess of this threshold while detector elements whose outputs exceed the high level $V_1$ are being passed over, and should still exceed the intermediate level $V_3$ when the "other part" of the split record entry is presented as a detector output. If this other part when added to the held value does not yield a sum exceeding the intermediate level, then the "other part" must have been taken as exceeding the high level, indicating an error.

Fourth Embodiment

A fourth embodiment of the invention directed to correction for fractional misregistration is especially applicable where there are two or more detector elements in sub-arrays of uniform configuration per record entry. In general, the set of modified values representing the record entries is derived by ignoring observed values for detector elements at one or more corresponding positions in all the sub-arrays when a predetermined proportion of such elements give observed values sufficiently different from those corresponding to the possible values. Such possible values are typically the binary numbers 1 and 0.

In this method, the detector is considered as a sequence of n-tuples of detector elements such as pairs or triples of detector elements. If a sufficient number of detector elements in a corresponding position in each n-tuple produces output (observed) values sufficiently below the maximum indicative of a 1 and sufficiently above the minimum indicative of a 0, then the outputs of those detector elements are ignored, and the bit values are determined from other detector elements in the n-tuples.

A particular arrangement according to this fourth embodiment has detector elements spaced at half the bit spacing (after any optical magnification) of spots forming record entries on an optical medium. In practice, optical magnification would be adjusted to achieve this relationship. Thus a spot could illuminate exactly two detector elements, or could fully illuminate one element and half illuminate the two adjacent elements. In the latter case, whenever the bits being observed were not all of the same value (0 or 1), at least one detector element would be half illuminated. By discarding the output from that detector element and all detector elements spaced an even number of elements from it, only detector elements which received full illumination for a 1 bit (assuming bits valued 1 are represented by low opacity), would be used to determine bit values.

Where a spot illuminates a smaller fraction of a detector element (say 0.2 of it), threshold values could be used to determine whether this is a ground for rejection of that detector output and others in that position within the other n-tuples.

Figure 14:
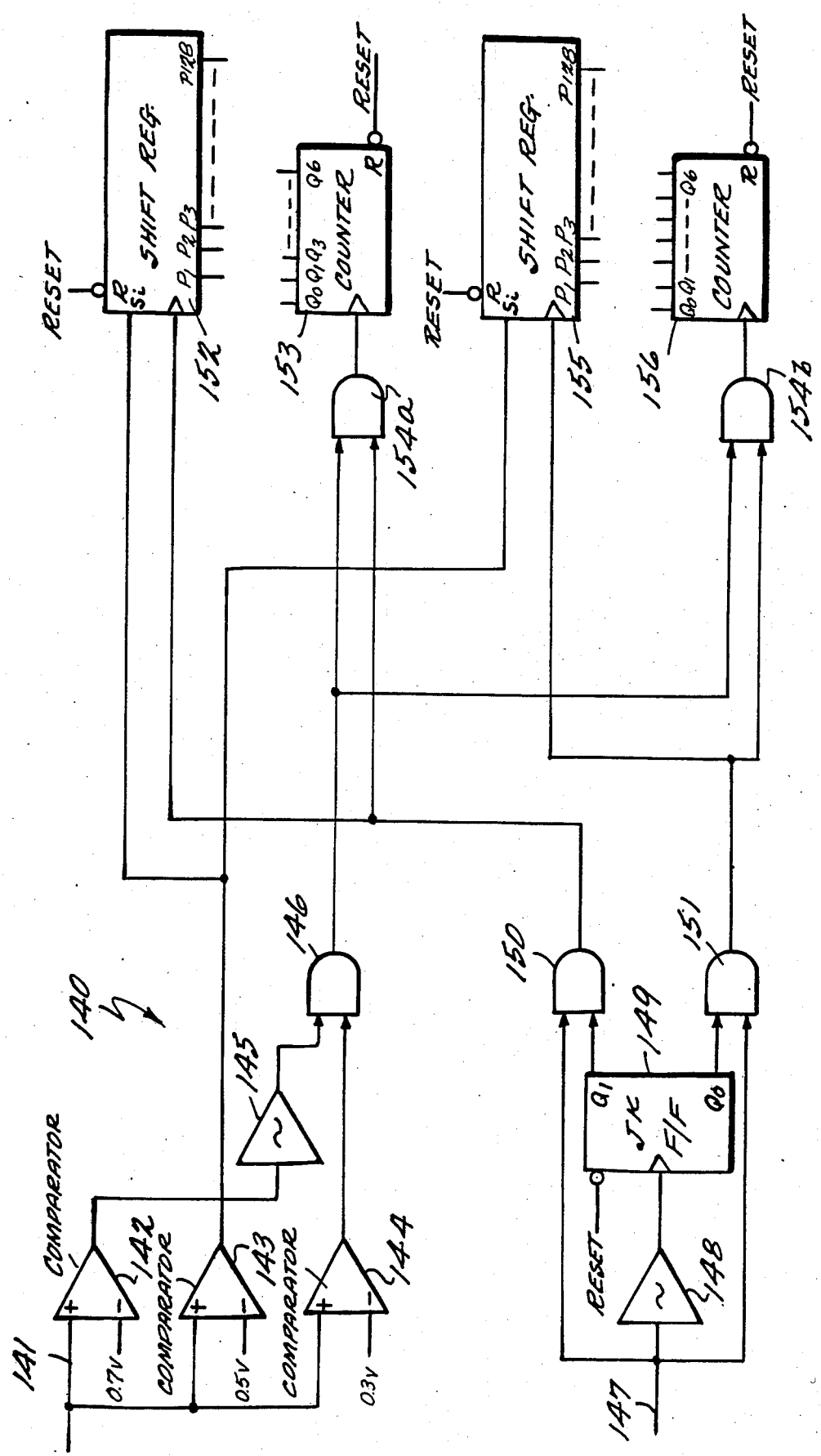
FIG. 14 is a block circuit diagram of apparatus for compensating for fractional misregistration according to a fourth embodiment of the first aspect of the invention.
Figure 18D:
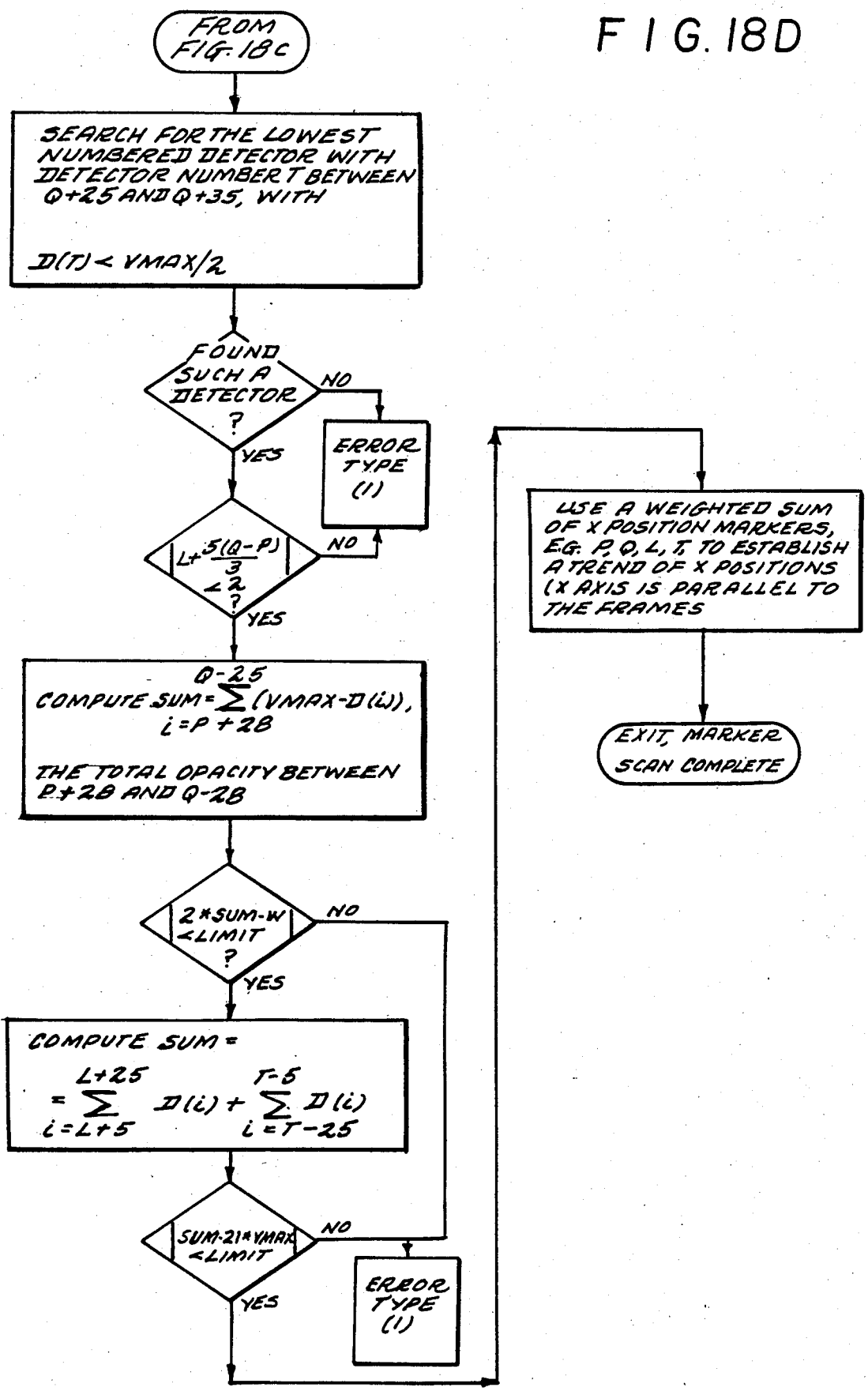

FIG. 14 is a diagram of a suitable circuit 140 for practising these principles, This circuit receives an input analog signal 141 from a charge-coupled detector which is selected relative to the frames of data bits so that there exists the prescribed n-tuple relationship between the detector elements and the data bits of each frame, specifically in this example a 2:1 relationship. The exemplary detector described earlier, a Fairchild CCD 111, presents a sequence of voltages in the range 0 to $-1V$, one for each element of the linear array of photosensitive detector elements comprising the device. For this application, the voltages would be inverted to the range 0 to $+1V$. Circuit 140 also receives a clock signal 147 which becomes true, i.e. rises, after the analog signal 141 had been presented for sufficient time for the comparators 142, 143, 144 and subsequent logic to settle, and becomes false, i.e. fall after the gating operations in the shift registers 152, 155 and counters 153, 156 are complete. When the clock signal 147 falls the inverter 148 generates a rising voltage which swaps the state of the JK flip-flop 149.

Suppose Q1 on the flip-flop 149 is true prior to the time when the clock signal 147 becomes true then if the analog signal 141 is between 0.3 volts and 0.7 volts, the comparator 144 produces a true signal, and comparator 142 produces a false signal which is inverted by inverter 145 to produce a true signal. Thus the AND gate 146 receiving these signals has both its inputs satisfied. In addition the AND gate 150 receiving the clock signals 147 and Q1 produce a true signal when the clock signal 147 became true, which in turn generates a true signal from the AND gate 154a adjacent to counter 153. This signal from AND gate 154a causes the counter 153 to be incremented by one.

At the same time, suppose the signal is greater than 0.5 volts (but less than 0.7 volts), then comparator 143 produces a true signal and when the clock signal 147 became true and the AND gate 150 produces a true signal, the shift register 152 moves a "1" bit into the $P_1$ position, moving all previously received bits along one bit position.

A short time after these operations the clock signal becomes false (i.e. it falls) and the inverter 148 generates a signal which causes the JK flip-flop 149 to change state so that Q1 becomes false and $Q_0$ becomes true. Consequently, the next analog signal affects only shift register 155 and counter 156 by way of gates 151 and 154b.

After 256 detector elements had been presented (as would be the case if the CCD 111A was used) shift register 152 would contain values related to odd numbered detector elements numbered 1, 3, 5, 7, 9, ... 255, and counter 153 would have a count indicating the number of these elements (1, 3, 5, 7...) which had signals between 0.3 volts and 0.7 volts. Similarly shift register 155 would contain values related to even numbered detector elements 2, 4, 6, 8, ... 256 and counter 156 would indicate the number of such elements whose signals were between 0.3 and 0.7 volts.

Since signals between 0.3 and 0.7 volts indicate neither full illumination nor full darkness, they correspond to cases where a detector element is covered partly by one record entry and partly by another which happens to have a different value. Thus the counters 153, 156 indicate the number of such detector elements in each of the (two) alternate positions in the n-tuples (here, pairs). If counter 153 has a significant count while counter 156 is zero at the end of a scan, then the even numbered detector elements are aligned in the middle of the record entries while the odd numbered elements must be positioned between record entries. Thus shift register 155 will contain an accurate record of the record entries while the contents of shift register 152 are likely to be strongly affected by tiny changes in the medium or the reading apparatus and should be discarded. If both counters are zero then either all record entries have the same value (0 or 1) or the borderlines between record entries fall between detector elements so that each detector element observes only one half of one record entry. In either case both shift register 152 and shift register 155 contain an accurate representation of the record entries.

Fifth Embodiment

A fifth embodiment for correcting for fractional misregistration may be employed where the possible values for the record entries are limited to the binary numbers 1 and 0, and where the record entry spacing is an integral multiple n, including n=1, of the detector element spacing. In accordance with this embodiment, the set of modified values representing each frame is derived by effecting small changes of the apparent positions of the record entries relative to the array of detector elements until a set of substantially only 1 and 0 values is obtained.

Thus detector outputs are only accepted when no partial outputs are observed. The required relative movements can be achieved by physical vibration of the detector, or of the medium, or by recording each bit as a bar at a specified angle to the normal direction of motion of the medium relative to the detector. Such bars would extend along the channel but vary in position with reference to the side boundaries of the channel and therefore with reference to the array of detector elements as the latter scanned along the channel.

Figure 15:
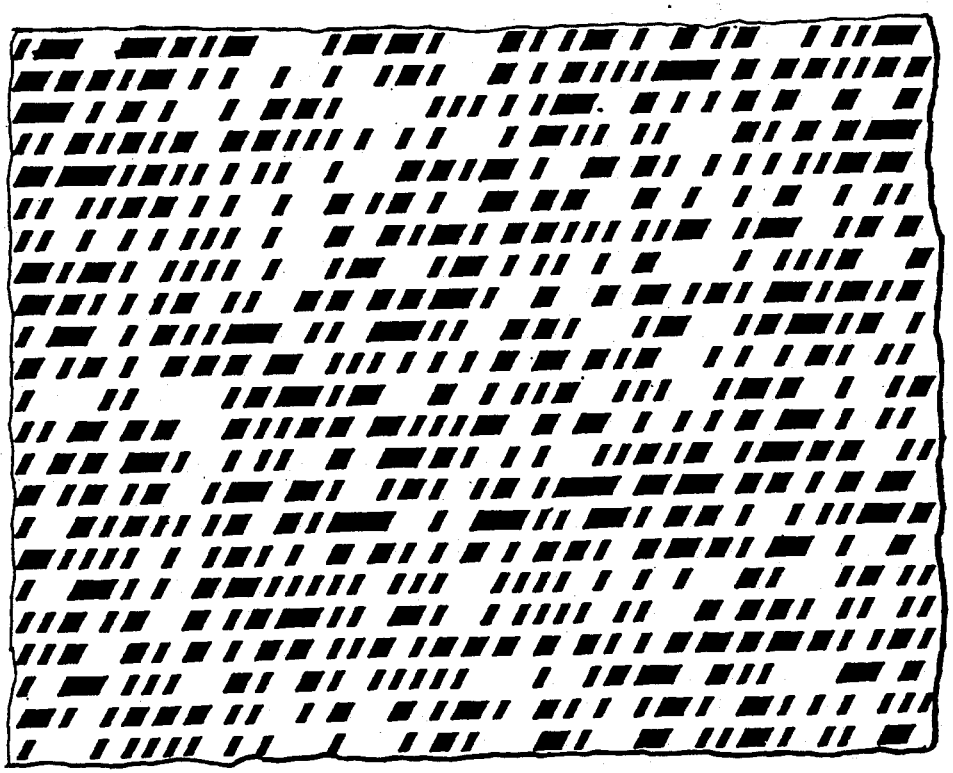
FIG. 15 is a plan view of a microfiche with a suitable arrangement of data for practising a fifth embodiment of the first aspect of the invention.

By way of example, and as depicted in FIG. 15, bits may be recorded on an optical medium, not as spots, but as lines aligned at an angle, say 30°, to the direction of motion of the read head with respect to the medium i.e. along the channel. The lines extend about 30 microns along the respective channel and have a thickness of about one-third their spacing between centres when measured along the frame (perpendicular to the channel), for optimum packing density. Suppose 0 bits are represented by opacity, and 1 bits are represented by lines of light, and that the detector element spacing along the frame matches the line spacing along the frame. Then a line might begin by illuminating two detector elements but as the read head moves along the channel and makes successive scans of the frame, the line will at some point, provided it is long enough, illuminate only one detector element. When this condition is detected by an absence of output values part way between the output value for a 0 bit and the output value for a 1 bit, the detector outputs would be sampled, and the bit values determined.

FIG. 16 is a diagram of a suitable circuit 160 for applying this fifth embodiment to the case just described where, by virtue of a data layout in accordance with FIG. 15, the required relative movement between detector elements and data bits arises during normal scanning along each channel. It will be noted that circuit 160 bears more than a superficial similarity to circuit 140 of FIG. 14: indeed the logical selection techniques of the two embodiments are similar. Circuit 160 will be described only with reference to its operation.

An input analog signal 161 is assumed to be provided by a charge-coupled device such as the Fairchild CCD 111 which has 256 detector elements and presents a voltage corresponding to the signal detected by each in succession. The input voltage is assumed to be in the range 0 to +1.0 volts, and is applied to three comparators 162, 163, 164.

The clock signal 167 is true for a short time (say 50 nanoseconds) after the analog signal for one detector element has been presented to the comparators for a similar but longer time. If the analog signal 161 is in the range 0.3 to 0.69 volts, then comparator 164 has a true output while comparator 162 has a false output so that inverter 165 provides a true signal and both inputs of AND gate 166 are satisfied. The clock pulse 167 causes AND gate 176 near the counter 173 to produce a pulse which will be counted by that counter.

If the analog signal is above 0.5 volts a 1 bit will be shifted into the shift register 172 when the clock pulse 167 arrives, otherwise a 0 bit will be stored.

As the detector (all its elements) passes over a frame of bits, repeated scans are taken. In each scan the signal "start scan" 169 resets the counter 173 and the shift register 172 before the presentation of analog voltages from each detector element. This signal is produced by a counter associated with the read head.

Another signal, produced by a counter in the electronics 48 driving the linear array, produces the end scan signal 168. When that signal becomes true, the digital comparator 170 compares the counter value stored in the counter 173 with a value stored in a register 171, which might be loaded, e.g., from the controlling computer. If the counter value is less than the value in the register a signal 175 sets a flip-flop 177 and opens a gate 174 to release the contents of the shift register as being an accurate observation of the record entries being examined, i.e. the set of "modified values".

The "found" flip-flop 177 shuts the AND gate 179 preventing further clock pulses from activating either the counter or the shift register, and also AND gate 179a preventing activation of the digital comparator. No further data readouts occur until it is time for the next frame, when the seek signal 178 resets the found flip-flop 177.

Correcting for Integral Misregistration

Even when one of the aforesdescribed embodiments, all reliant on the limitations on the range of possible values, is utilized to derive a set of modified values indicating record entries for each frame, the modified values may be associated with detector elements in a manner which involves integral misregistration. By this is meant misregistration, "misalignment" or "lack of synchronization" by a whole number of detector element or record entry spacings. The second aspect of the invention is directed, in one facet, to compensating for this form of misregistration. In the simplest case, applicable where the record entry and detector element spacings are known and uniform, the "modified values" derived in accordance with the first aspect of the invention are fed to a UART or are processed according to the UART rules. The latter approach is the favoured technique as the final step of the first and third embodiments of the first aspect of the invention, indicated in FIGS. 6 and 11 as correction for integral misregistration. The time when the output should be sampled is computed as $(\frac{1}{2}+N)T$ after the initial rising edge, N being the record entry number and T the number of detector elements per record entry. If a sample time occurs in the present detector element, the modified value is taken as the bit value unless a transition was recorded as occurring before $(\frac{1}{2}+N)T$, whereupon the complement of the modified value is used.

Other techniques entail identifying one or more marker patterns among the modified values, and utilizing the marker patterns to derive, from the modified values, an accurate representation of the record entries of the respective frame.

According to a first embodiment of this second aspect of the invention, once a sequence of bits which match the bits on the medium is obtained, it is placed in a shift register, and shifted until the known pattern, unable to be replicated in the data, is observed in a particular sequence of bits.

In an examplary method the data is coded so that each subsection of it must have at least one bit set to a 1. Then a pattern consisting of a sequence of 0 bits, longer than any such subsection, may be used as a marker to identify a particular part of the respective frame. This part may be the start, or end, or some position within the sequence. In this way, the marker pattern is utilized to assign positions and hence significance to the record entries independently of the detector element(s) used to observe them.

By way of simple example, consider a case in which the code pattern comprises ten 0 bits followed by a 1. Then associated circuitry may be arranged to read out eleven successive bits of the "modified values" signal, held in a shift register, to a large AND gate enabled by eleven 0 inputs, of which the eleventh is associated with an inverter to locate the characteristic 1 being sought. A suitable such circuit is depicted in FIG. 17. The circuit includes a shift register 84 into which are loaded the modified values obtained in accordance with the first aspect of the invention. The register may contain the values already as a direct result of application of such first aspect.

Once that correction is complete, the signal SSCAN is generated, setting the shift flip-flop 85a and resetting the start flip-flop 85b. This results in the clock 86 commencing to generate pulses, and the negation of the AND gate 87a which provides output from the logic shown to a Universal Asynchronous Receiver Transmitter (UART) (not shown).

As the clock 86 generates pulses, each of which causes the shift register 84 to move the values it contains one position to the left, the leftmost 11 values are presented to the large AND gate 88, 10 of them being directly connected, and the 11th (the rightmost bit of the 11) being inverted at 88a. Hence, AND gate 88 is satisfied only when the leftmost 10 bits are 0 and the 11th bit is a 1. At that point AND gate 88 asserts a true signal and sets start flip-flop 85b. This, via the Q1 output, enables small AND gate 87a, allowing subsequent bits to be sent to the UART.

In addition, when the Q1 output of the start flip-flop 85b becomes true, the small AND gate 89a allows the clock pulses to be counted by a counter 89. The outputs Q0 to Q7 of counter 89 are connected to a digital comparator 89b which compares the count to a fixed value set by connecting the comparison inputs 89c to voltages representing true or false.

When the appropriate count of pulses has been reached, the digital comparator 89b asserts a true signal 89d which resets the shift flip-flop 85a, stopping the clock and any further shifting out of bits. Any remaining bits in shift register 84, which would be from another channel, are then discarded.

Naturally, a binary complement of this arrangement, in which data subsections contain at least one 0 and the pattern consists of all 1 bits, could be used. Also, two or more occurrences of the same pattern, or two or more different patterns, could be used as a single or multiple markers.

According to a second embodiment, where detector elements in a linear array are successively or serially observed, the known marker pattern may be detected by counting successive bits until a bit is observed which does not match the pattern or until the count of matching bits reaches the length of the pattern.

By way of example, consider the case where all bits in the known pattern have the same value. As successive bits are detected, a counter or electronic shift register increments if the bit detected was of that value, and resets if not. When the counter reaches a certain value equal to the length of the known pattern, the pattern is deemed to be observed.

When instead bits of both values (0 and 1) are used in the pattern, the counter is incremented when a bit corresponding to the first bit value is observed. Thereafter, bits are compared with bit values selected by the count. A match results in a further increment to the counter, and a difference results in the counter being reset. The selection could be arranged by reference to a memory indexed by the counter value, or by the value of a binary identification circuit directly connected to the device(s) storing the counter value. A more specific arrangement would use the value of a particular bit in the counter as the required bit, or the complement of the required bit.

To exemplify these principles, reference is again made to FIG. 8. The set of modified values 83 commences with the pattern 1010 which is not replicated in the rest of the set. If the apparatus has been informed that 1010 is a marker pattern indicating the start of data, or more specifically that the data commences with the next bit, it will be able to locate the residual modified values as an accurate representation of the frame and thereby correct for the random misregistration by whole detector element spacings. This might be done by counting the modified values as outlined above. When a count of 4 is reached, the marker pattern will have been identified.

In some cases, it may be necessary to make provision to correct for physical expansion or contraction of the medium in which the information is stored, or of the spacing between the detector elements, or of the detector where elements are defined by a continuous detector, or of changes in magnification of light from optical media.

With optical media, this could be overcome by automatic changes to the magnification, arranged by electrically driven assemblies which move the optical system relative to the medium and read head, or the read head or the medium relative to the other components.

A particular arrangement of this method could be to mount a lens system on a threaded rod or rods which were rotated by electric motors under control of the computer system receiving the data read from the medium, achieving a small linear movement parallel to the axis of the threaded rods, which axis would be parallel to the primary ray passing through the optical system.

Alternative methods apply to the Dynamic/Serial methods of overcoming fractional bit spacing misregistrations. A first method would be to adjust the clock frequency governing sampling of data as it was produced, as observed values, by the detector system. An increase in the size of the storage medium (after magnification) relative to the detector element spacing, could be compensated by increasing the time between successive samplings of the observed values.

By way of example, this method might use a voltage controlled oscillator or pulse generator and entail changing the controlling voltage by loading a digital to analog converter from the computer receiving the data, or by allowing this computer to increment or decrement the voltage with positive and negative charge-pumps connected to the capacitor in a sample-and-hold circuit.

Another method applicable to dynamic/serial reading techniques is to reduce the number of bits over which time must be correct to less than the number of bits in a frame. This would allow long frames offering high packing density, and would still allow some accommodation of size change.

An example of this method is to introduce (self) clocking information into the data recorded on the medium. Alternatively, one might use phase-encoding methods, where each bit position is indicated by a transition in one direction, and the value at the bit is determined by the delay from that transition to a transition in the reverse direction. A still further approach might be to record data on the frame in n-tuples beginning with a bit of known value. When this bit is detected, a clock is started and n−1 or fewer bit values are sampled at subsequent clock pulses. Thus the clock need only be accurate over n bits. If, for example, a variation of 40% of a bit time could be allowed in the sample time relative to the start of a bit and n was chosen to be 10, a 4% change in size or magnification could be accommodated without adjustment of clocks or optical systems. An additional advantage of this method, which is similar in principle to the operation of a UART, is that the known pattern used to identify the start (or other position) of a frame could be a pattern of bits whose values were all opposite to the value of the first bit of each data n-tuple.

Synchronization Using Markers

Channel Synchronization

The immediately preceding chapter of this specification was concerned with compensating for integral misregistration or lack of synchronization between the "modified values" derived according to the first aspect of the invention and the actual data bits or record entries of the respective frame. Before a frame can even be read, the read head must be properly synchronized with the channel containing the frame and held synchronized both with the frame and the channel as the head scans along the channel. As already foreshadowed, the second aspect of the invention is, in a further facet, concerned with the provision of position indicators by which this synchronization can be achieved, for example markers 30, 32 in FIG. 1. These markers can also pre-empt any need for compensation for integral misregistration and are thus perceived as an alternative to marker patterns and the like, but an alternative which can serve wider purposes.

With reference to FIG. 1B, each marker 30 comprises, e.g., an illuminated or translucent zone on the microfiche save for a triangular, relatively opaque zone 184 with its apex at the broad, rear, edge 180 of the marker 30 ahead of the leading frame of the adjacent channel segment. Marker 30 is 450 microns wide along edge 180 and 90 microns wide at its narrow leading edge 181. Each of the two steps 182, 183 at each side is also 90 microns wide. The detector elements occupy 3 microns —30 elements per edge 181, 182, 183. As previously explained, the detector element array simultaneously scans over its full width (at 15 micron intervals —the frame separation) as it moves evenly from edge 181 to edge 180.

It will be appreciated that the specific dimensions just quoted are exemplary only, that a wide variety of dimensions, both absolute and relative, could be used.

The edges of marker 30 are positioned precisely with respect to the associated channel segment and they comprise features of the marker which are characteristically located on the medium with respect to the channel. In particular, edges 180, 181, 182, 183 are parallel to and at respective predetermined distances from the centre line of the first frame 24' of the channel, while side edges 181a, 181b; 182a, 182b; 183a, 183b are parallel to the channel at predetermined distances, parallel to the first frame, from the first record entry or data bit 26' of that frame. For example, edge 180 is typically 30 microns from the centre line of frame 24', and edge 183a is 22 microns laterally from the centre of bit 26'. The 30 micron separation allows the microprocessor adequate time to establish the initial trend for practising the third aspect of the invention: this is disclosed in greater detail below.

A suitable control and analysis circuit for scanning and utilizing marker 30 is the digital microprocessor circuit of FIG. 5, programmed with particulars of the aforementioned predetermined distances characterizing the marker. A flow chart for analysis of the marker, and the responsive synchronization and other operations, is spread over FIGS. 18A to 18D, and will now be described in detail. As before, it is assumed that each scan comprises simultaneous exposure of the whole scan width to a photosensitive charge-coupled detector element array. The detector element values are digitized and transferred to system memory, and a pointer then serially accesses the values in memory. Readings indicated as single value tests are generally, in practice, averaged over a range of detector elements. The numbered error types, for which flags are raised and reading may cease, are as follows:

| Error # | Error Type |
|---------|------------|
| 1 | Marker severely damaged |
| 2 | Illumination no good |
| 3 | Skew too large |
| 4 | Optics out of adjustment |
| 5 | Magnification out of range |
| 6 | Image is distorted |
| 7 | Speed wrong |

The locations of the scans at which selected steps in FIG. 18 are effected are indicated in FIG. 1B by use of the numbers by which the scans are identified in FIG. 18.

In FIG. 18 the symbol marked "scan" followed by numeral in parentheses indicates the following action:

(a) Wait for any exposure of the detector to complete, (b) Initiate a new exposure to span a length of 15 microns along the channel. Note that it is possible to adjust this length during the exposure process by storing a new value for the time of exposure in a counter in the timing control section 58 in FIG. 5.

(c) Read out the detector element values from the scan just completed, digitize them, and transfer the digital values to an array referred to as D.

The numeral in parentheses serves to indicate the length, in units of 15 microns, progressed up the marker shown in FIG. 1B.

FIG. 18 does not show the full detail of the loops involved in operations such as locating particular values in the array D, or adding up values from that array. These loops would initialize a pointer, then increment that pointer each time around the loop until a limit was reached, and do not involve any novel features within themselves.

Briefly, the functions performed by the flow chart in FIG. 18 are as follows:

(a) Scan (0) seaches for the start of the marker, being the relatively narrow bottom edge. This search allows accommodation of variations in starting position along the channel.

(b) Scan (1) checks that the marker has been found by testing that element outputs above the noise level minimum VMIN continue to exist 15 microns after the start of the marker (c) Scan (2) locates the detector element number N nearest the left hand edge of the bottom section of the marker. Subsequent tests ensure that the detector will span the channel. If a positioning error is observed a corrective motion is initiated. A single step of 100 microns is expected to correct for all such errors except at the start of a channel. The more complicated processing in that case involves determining whether the move needed can be performed in time for the next phase of marker processing, and aborting the Y movement, that is, along the channel, if there is insufficient time.

(d) Scan (4) is used to measure the maximum signal amplitude, presumed to correspond with full illumination, and to test that that amplitude is within an acceptable range.

(e) Scan (6) occurs at the junction between the middle and lower parts of the marker and is used for the first skew determination. Detector elements near the vertical edges of the middle section will have outputs which depend on the distance they have moved (up) into the middle section. The difference between these outputs, as a fraction of VMAX gives a good approximation to the skew measured in units of 3.58 degrees. (This is $\tan^{-1}(15/240)$: 15 microns is the movement in the Y direction and 240 microns is the X separation).

If the absolute value of the skew, $|SK1|$, is within range and non zero, then a movement of the optics assembly may be required so that the skew will not take the channel beyond the span of the detector during the scanning of the block or section. The limits HIN and LON are used to determine whether such movements should be made.

In addition Scan (6) is used to make the first synchronization with movement along the channel. This is done by computing the average distance travelled into the middle section of the marker, and adjusting the value which a counter in the timing and control section 58 in FIG. 5 must reach, before the microprocessor is advised that the scan is complete.

(f) Scan (8) measures the width Q-P of the middle section, ensuring that the X position has not moved too much and that the said width is within limits. If not, an unacceptable change in optical magnification or media size may have occurred.

Scans 9 to 12 bring the detector up to the bottom of the triangle in the centre of the marker.

(g) Scan (13) should occur half before and half after the bottom of the triangle. The sum of opacities, represented by the differences between detector element outputs and the maximum possible such output, of most of the detectors within the width of the middle section, provides an accurate indication of how far the detector has progressed across the bottom of the triangle. This is used for another synchronization step.

(h) Scan (15) should occur half way between the bottom of the triangle and the bottom of the top section of the marker. The total opacity V should be approximately 60 times VMAX where detector elements observe 3 microns in the X direction so that 60 detectors are covered by the opaque triangle at scan number 15.

(i) Scan (17) is scheduled to occur at the bottom of the top part of the marker, and provides an admirable opportunity to recheck the skew. SK2 indicates skew in units of 2.04° (15 microns/420 microns). If the skew as measured here does not closely match that measured in test (e), the marker may have been incorrectly recorded.

At the point where scan (17) occurs, the width of the opaque triangle should be 120 microns, two thirds of that observed by scan (15). A summation of opacity as described in (g) above can be expected to yield a total W whose value is two thirds that of V.

Moreover after the timing synchronizations performed first at the bottom of the middle portion and later at the bottom of the triangle, the total opacity W should provide a very good indication of the speed of traverse along the channel. The smaller the opacity, the greater the distance, hence the greater the speed, and the smaller the desired exposure time.

(j) Scan (19) will occur half way up the widest section of the marker and is used to provide the width of this top section. Only limited numbers of elements are inspected as a good knowledge of the marker should now be achieved. Failure to observe the change in detector output indicating the edge within a limited distance from its expected position, and failure of the ratio of the widths of the top two sections of the marker to be 5/3 will result in an error being posted.

As discussed, the location of marker 30 on the fiche is precise with reference to the succeeding channel segment. The reader is programmed with the expected displacements previously outlined and has accordingly now made necessary adjustments and knows where to find the X-Y co-ordinate of the associated channel segments. Synchronization with reference to the channel is complete.

Frame Synchronization

Figure 19:
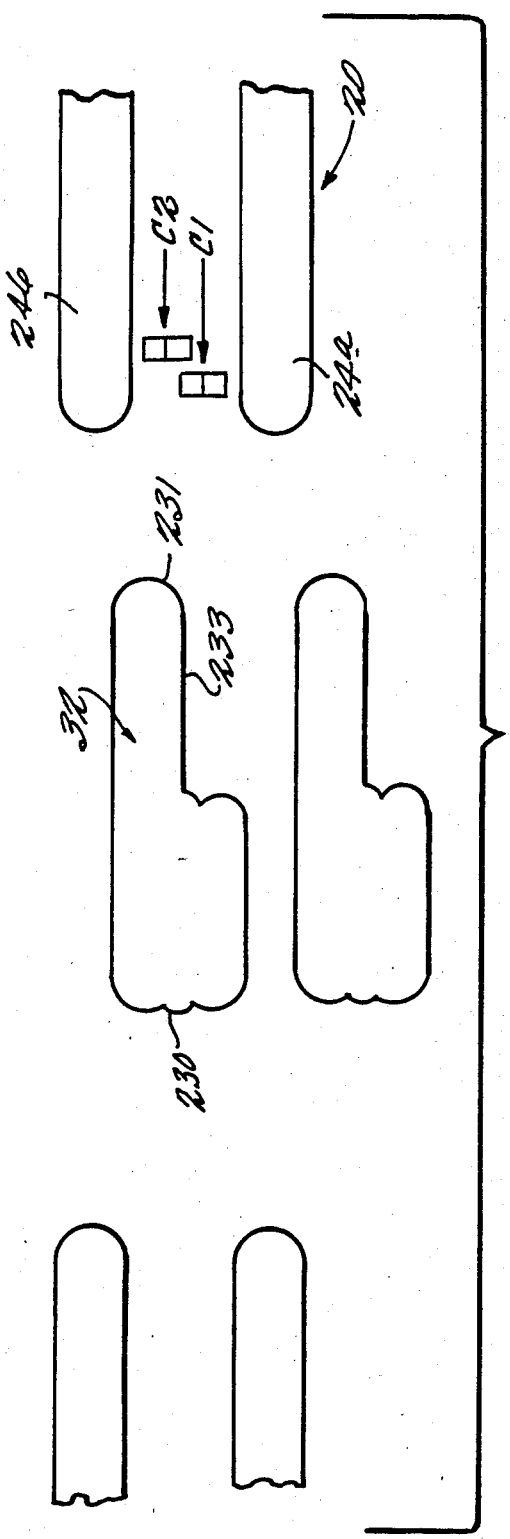
FIG. 19 is an enlarged view of part of FIG. 1B, highlighting a frame synchronization marker.

FIG. 19 is an enlargement of a small representative portion of FIG. 1B showing a pair of the frame synchronization markers 32 and their physical relationship to respective frames 24a, 24b of the adjacent channel 20. The detector element array or read head scans marker 32 on a short scan after it has scanned frame 24a and before it commences a scan of the next frame. Small rectangles C1 and C2 indicate the position of the detector element array at the start and finish of the marker scan: it will be noted that the array is well clear of both frames during this short scan.

The marker is designed to provide its useful information, X and Y locations of the first bit of frame 24b, within the Y span of the C1-C2 scan. On the other hand, it is desirable that edges providing the information extend over several detector element positions (preferably at least three) in the X direction and appear to be of substantially infinite extent in the Y direction. The illustrated marker therefore provides extreme side edges 230, 231, a step 232, and a leading edge 233 recessed by step 232, all within scan C1-C2. Edges 230, 231 and 232 are parallel to the channel at prescribed displacements, parallel to the frame, from the first data entry 26 in frame 24b. Edge 233 is at an exact Y location between frames, i.e. parallel to and at a predetermined distance from the frame 24b.

Figure 20:
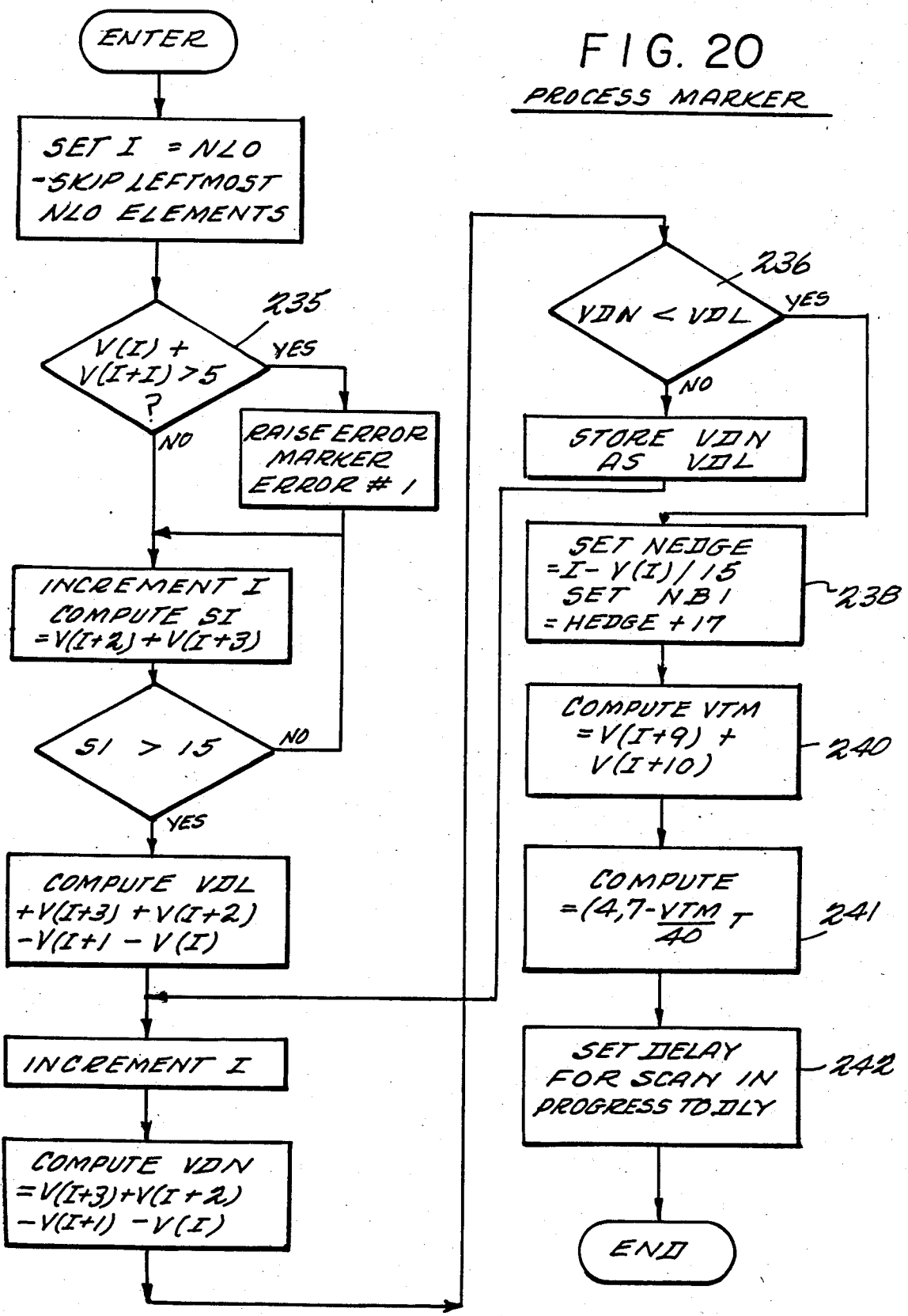
FIG. 20 is similar to FIGS. 18A-18D but is concerned with reading and analysing a frame synchronization marker.

FIG. 20 comprises a flow chart for the steps involved in the short scan of each frame synchronization marker. In this flow chart, I is the detector element position with respect to the left end of the detector element array, NLO is a start value of I clearly to the left of the marker set by the controller following analysis of the channel synchronization marker at the head of the respective channel, and V(I) is the observed value stored in and output from detector element I on serial reading of the array during the time delay before scan of the next frame commences.

An initial test (235) is first effected by checking that V(I+1)+V(I) is not greater than a noise level minimum. If so, there is a serious fault and error flag #1 is raised. The edge 230 is then sought out by finding the location where the difference between the sum of the values observed by one pair of detector elements and the sum of the values of the adjacent pair of lower number is a maximum (236). Just after this point is reached, the detector element within the said group or 4 detector elements which has the lowest detector number and is therefore furthest from the frame of data, will be located on the edge of the transition of the marker. Its value will thus indicate the extent to which the marker covers it and hence provide a more accurate fractional indication of the marker position. If the value is midway between the minimum and maximum then the marker edge will lie at the midpoint of the detector element, whereas if the value was the minimum then the edge of the marker would lie between the said detector element and its neighbour of higher detector number. Thus the position of the edge may be computed as the detector number plus ½ minus the detector value as a fraction of MAX (assuming the minimum value is zero). The centre of the first record entry in the frame is 17 detector elements away (238) in the direction of increasing detector number in the case where there are 2 detector elements per record entry.

At this point I is the detector element immediately to the left of edge 230. In the example, marker 32 is 36 microns across in the X-direction, i.e. 12 detector element spans. Thus, by summing (240) the observed values at I=9 and I=10 (the latter being within the edge 233), an accurate assessment of the location of edge 233 in a direction along the channel is possible by examining the magnitude of the said values. High values indicate a greater progression of the detector across the edge 233 up the channel. The controller then relates the result to the required delay time until scanning of the following frame is to terminate, taking account of the speed of the read head (241), and makes any adjustment necessary (242). This completes the Y-direction synchronization.

Distinguishing Local Faults in Position Markers

In the aforedescribed techniques of achieving synchronization of the microfiche frames and the read head, any individual position marker, such as either of the characterizing edges 230, 233 of markers 32 or any of the several analysed edges of markers 30, is susceptible to drastic local modification. Typical causes of such modification, especially given the size of markers 32, are dust specks, condensation, scratches, soiling, or other like "weathering". These will result in "spot errors" in the medium which may be sufficiently large not to be eliminated by simple averaging of multiple measurements along an edge but which might cause the reader controller to raise a major error flag and cease reading. As discussed earlier in the specification, such would be the traditional outcome.

In accordance with the third aspect of the invention, however, there is provided a technique, somewhat stochastic in nature, by which local errors in position markers can be distinguished from true indications of position errors and the effect of the observed value reduced. The technique essentially comprises observing and storing a predetermined number of successive values, in this case position indicating values, determining whether each observed value is outside a selected trend established by the stored values by more than a predetermined margin, and, if so, rejecting that value.

By way of example, consider the case where synchronization markers 30, 32 are being read and analysed under microprocessor control, with a microfiche layout as in FIG. 1, a reader configuration as in FIG. 2A, and a control circuit substantially as in FIG. 5. The position for the first bit in the leading frame of the first channel is determined by analysis of the preceding channel synchronization marker (30 in FIGS. 1), as described above. This position is stored at all ten (say) sites in a First-in-First-out (FIFO) buffer register, sometimes referred to as a SILO. Marker 30 is sufficiently large and adequately scanned so it is able to be observed with greater confidence in the observation than in the case of the much smaller markers 32, simply because the large marker provides the opportunity for repeated observation. The initial position stored in the FIFO buffer thus sets the initial trend required to practice the invention.

Figure 21:
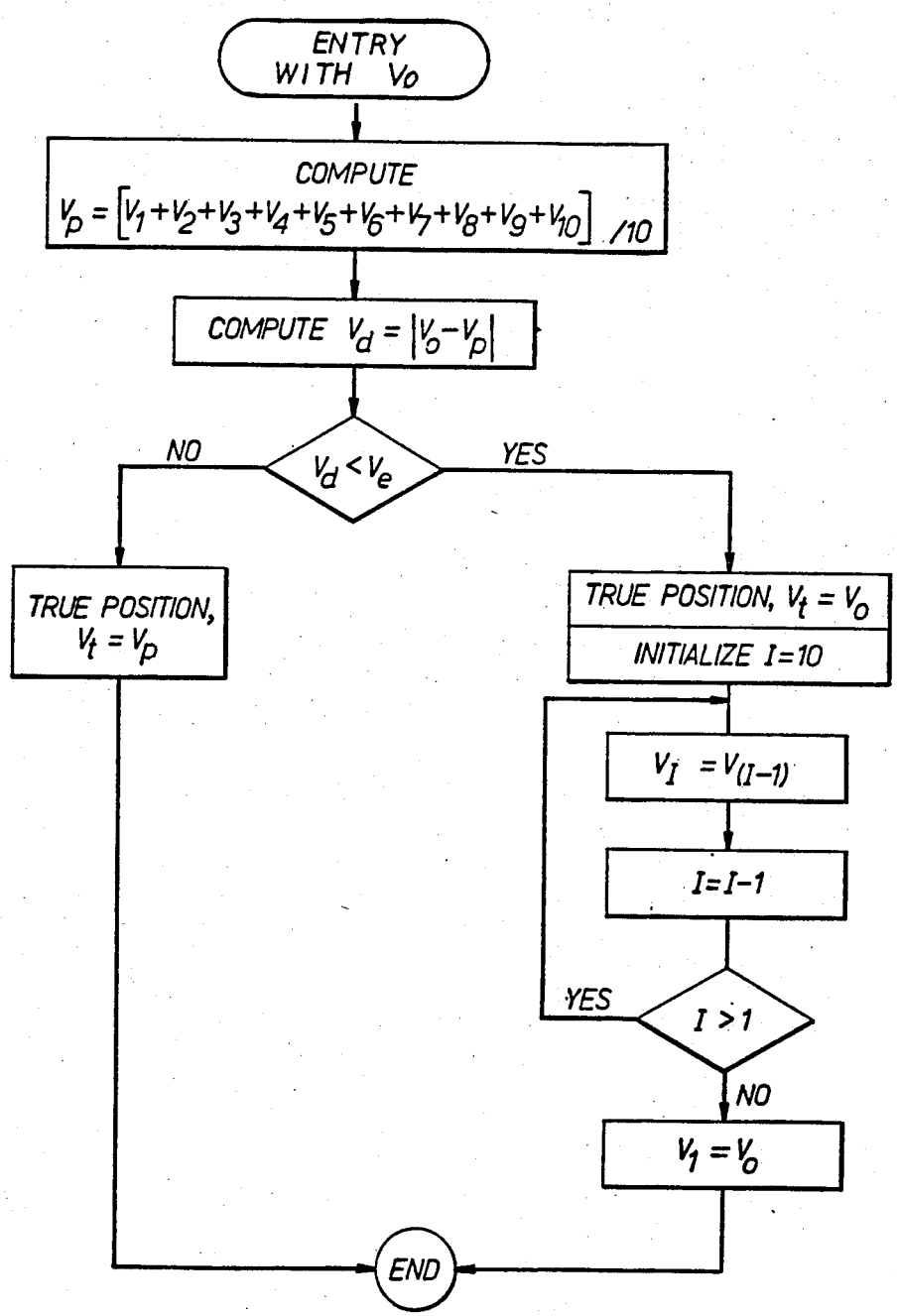
FIG. 21 is a flow chart for performing part of an embodiment of the third aspect of the invention.

As the read head travels up the channel, the successive frame synchronization markers (32 in FIGS. 1 and 19) are analysed, also as already described, to check the aforesaid position. The dangers of relying too heavily on a reading of any one marker 32 are avoided by practising the third aspect of the invention by way of the steps set out in the flow chart of FIG. 21, in which Vn is the observed value at position n, in this case position marker n.

The initial equal values in the FIFO buffer obtained from marker 30 are replaced in sequence by subsequent observations so that the set contains the latest ten observations. After each updating, the processor computes (250) the simple average $V_p$ of the stored values and treats this as an established trend with respect to which the currently observed value $V_o$ is compared (252). If $V_o$ exceeds $V_c$ by more than a predetermined margin (254), then $V_p$ is disregarded and the true value $V_t$ is taken as the predicted value $V_p$ (256). If not, then $V_t$ is set as $V_o$ (257) and the cycle proceeds.

Figure 22:
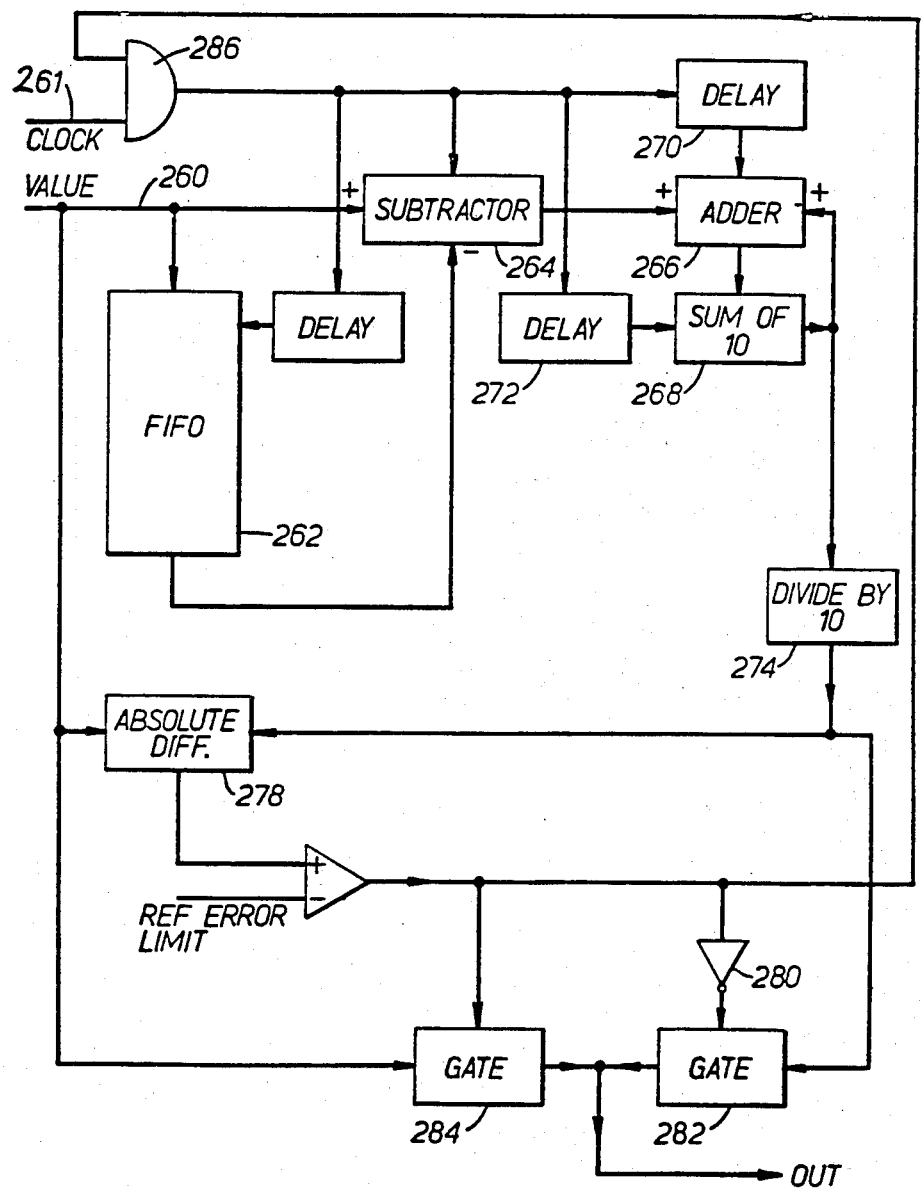
FIG. 22 is a block circuit diagram of part of an alternative, analog based embodiment of the third aspect of the invention.

FIG. 22 shows a simplified representation of an electronic arrangement, which could be either analog or digital in nature, for computing the average of the last 10 values, and comparing each new value with that average. Each value (260) representing a position is presented to the FIFO buffer (262) and subtractor (264) which also receives the output of FIFO (262). The output of subtractor 264 is applied to adder (266), the output of which is applied to sum of 10 register (268). The output of sum of 10 register (268) represents the sum of the previous 10 values, since adder (266) produces the total of the previous sum of 10 values and the extent to which the newest value alters the sum of 10 values (as received by subtractor (264).

The average of the previous 10 values is produced by the "Divide by 10" circuit (274), and is compared with the most recent value by the subtractor (276) which produces a positive signal equal to the modulus of the difference. Provided that the modulus is less than a prescribed error limit, then the output of the comparator (278) will be true, so that the gate (286) will allow the clock signal to enable the additions and subtractions provided by the adder (266) and subtractor (264), and thereby update the sum at 10 value with the newly arrived position value. In this case, where the output of comparator 278 is true, the received value (260) is presented at the output by a gate (284). However, if the signal (260) exceeds the error limit, then the output of the comparator (278) will be false, in which case the sum of 10 register will not be updated, and the output from the divide by 10 register (274) will be presented at the output by a gate (282). Obviously adder (266) must not operate until subtractor 264 has operated and register 268 must not be clocked until adder 266 has been operated. Accordingly, delays (270) and (272) are provided with delay (270) being greater than delay (272).

Figure 23:
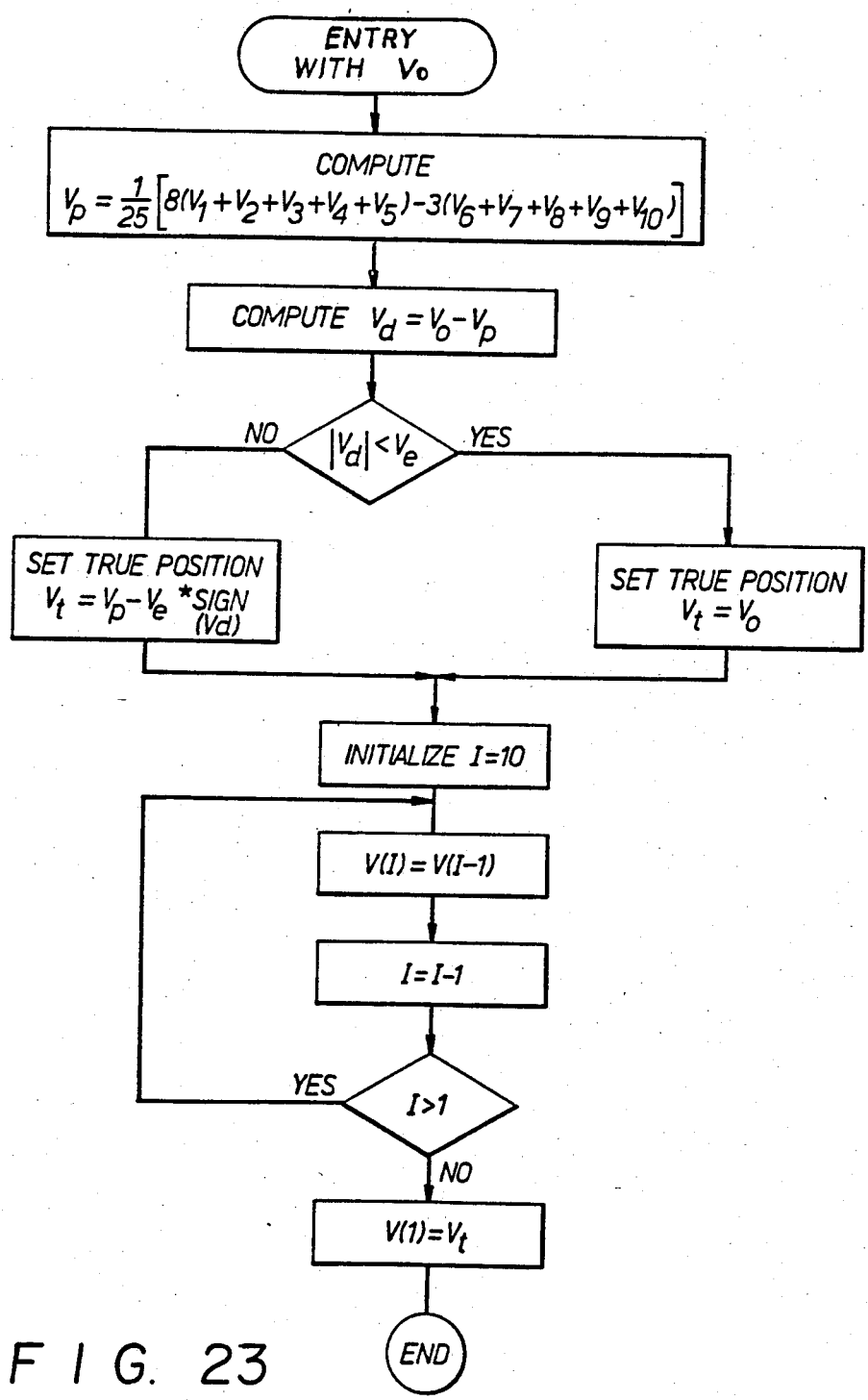
FIG. 23 is a flow chart corresponding to FIG. 21 but in respect of a still further embodiment of the third aspect of the invention.

In a variation, a higher order trend is obtained by computing an average of the stored values in which weights, positive or negative, are assigned to the values according to their age. FIG. 23 is a flow chart for an example of such a variation, in which the predicted value $V_p$ is $8/25(V_1+V_2+V_3+V_4+V_5)-3/25(V_6+V_7+V_8+V_9+V_{10})$. Here a linear trend is computed as $V_p$, and the difference, $V_d$, between the observed position $V_o$ and the predicted position $V_p$ is calculated.

If the magnitude of $V_d$ exceeds an error limit $V_e$ then the true position is taken as a position $V_e$ units from $V_p$ in the direction towards $V_o$ (but not as far). In effect the magnitude of the deviation from the predicted path has been limited.

With trends other than simple averages it is necessary in general to update the stored values even when a position observation has been reduced in effect, least the linear or other trend be left unprogressed at the next observation. FIG. 23 shows that, in this case, the stored values are updated regardless of possible error in the position value.

In general, the third aspect of the invention is especially applicable where:

(a) The accuracy of the location of the data on the medium is greater than the accuracy of the reading device;

(b) any mispositioning will normally be a result of incorrect mechanical movement within the reader, specifically of the medium with respect to the read head;

(c) because mechanical movements are slow in comparison with electronic speeds, and because new media must be of high density and transfer rate to be competitive, the mispositioning during the time between transfers of a small number (say less than 100) of bytes should be small, and be considerably smaller than that required to cause a data error; and (d) if a significant mispositioning is reported after a series of closely spaced position reports indicating correct or adequate positioning, then the reporting of the mispositioning is likely to be in error.

I claim:

1. A method of reading information stored in a medium as multiple machine readable record entries arranged in frames which are themselves arranged in one or more channels, which record entries are indicative of values from a limited set of possible values, comprising:

observing each frame in turn with a substantially known arraya of detector elements each having a limited field of observation such that each record entry is at least partly within the field of observation of at least on detector element, and such that each detector element responds to each record entry within its field of observation in relation to the fraction the record entry within the field of observation, whereby to produce a first set of observed values for each frame represented by the statres and/or outputs of the detector elements; and deriving from the first set of observed values a second set of values, each being one of said possible values representing record entries of the frames, said deriving step including the step of manipulating said observed values, using limiations on a Range of said possible values so that at least those observed values of the first set ascertained not to be equal to one of said possible values are modified to become one of said possible values, whereby being effective to correct for any fractional misregistration between the record entries and the detector elements.

2. A method according to claim 1 wherein the array of detector elements utilized is of substantially greater span than each record frame and simultaneously observes all the record entries of each frame in turn, and wherein said observed values are stored and serially read for said deriving step so that the time at which a value is read bears a known relationship to the position of the respective detector element along the array.

3. A method according to claim 2 further characterized in that successive small segments of a continuous linear detector are read by directing a wave along the detector whereby to develop a moving conductive window between the detector and a more conductive layer which serves to transport the stored value to the output.

4. A method according to claim 3 further characterized in that the wave is propagated in a material such as piezo-electric material which generates a voltage in response to the wave, which voltage, when applied to the gate of a continuous layer of Field-effect transistor material, opens the moving conductive window.

5. A method according to claim 1 or 2 wherein said record entries are equispaced in a first linear array and the detector elements are equispaced in a second linear array.

6. A method according to claim 1 wherein the array of detector elements utilized is defined by one or more detectors which are arranged to observe successive spatial positions in respect to which they form transitory detector elements.

7. A method according to claim 1 wherein the detector elements utilized are photosensitive charge storage elements and wherein said observing step comprises exposing such elements to light influenced by the record entries of the frame.

8. A method according to claim 1 wherein outputs from successively positioned detector elements are successively presented at regular intervals, and said modified values, while being restricted to values representing only said possible values, are produced at times which vary from the times of presentation of the detector element outputs in a way which reflects the magnitudes of the detector element outputs.

9. A method according to claim 8 wherein the variation in the time of transition from each modified value to the next, with reference to the presentation of the related detector element outputs, is proportional to the difference between these outputs and predefined levels.

10. A method according to claim 9 wherein said possible values are the binary numbers 1 and 0, transitions from 1 to 0 are delayed in proportion to the difference between the leading detector element output and that corresponding to a 0, and transitions from 0 to 1 are delayed in proportion to the difference between the leading detector element output and that corresponding to a 1.

11. A method according to claim 1 wherein the states and/or output of the detector elements are read serially so as effectively to produce a time-based analog signal comprising said set of observed values, and wherein said modified values are derived therefrom by extracting, from said analog signal, a set of modified values corresponding to the binary numbers 1 and 0, by use of digital communications circuitry.

12. A method according to claim 1 wherein said record entries are equispaced in a first linear array and the array of detector elements are equispaced in a second linear array, and wherein detector element outputs are presented sequentially at regular intervals according to their position in the linear array, the number of detector elements per record entry is greater than one and may or may not be a whole number, and the derivation from the continuously variable signal available from each detector element to that representing a possible value is achieved by sampling the outputs of successive detector elements at times which depend on that output, and by determining the modified value to be that represented by the possible value closest to the detector output being observed.

13. A method according to claim 11 or 12 wherein said derivation of the modified values is effected by employing a universal asynchronous receiver/transmitter (UART).

14. A method according to claim 1 or 2 wherein the possible values are the binary numbers 1 and 0, the centre-to-centre spacings between detector elements and between record entries, as presented to the detector elements, are respectively equal and uniform, and wherein the set of modified values is derived in part by carrying intermediate values substantially different from the maximum and minimum detector element output values, for addition to other intermediate values.

15. A method according to claim 1 wherein said record entries are equispaced in a first linear array and the detector elements are equispaced in a second linear array, and wherein there are two or more detector elements in sub-arrays of uniform configuration per record entry, and the set of modified values is derived by ignoring observed values for detector elements at one or more corresponding positions in all the sub-arrays, when a predetermined proportion of such elements give observed values sufficiently different from those corresponding to said possible values.

16. A method according to claim 15 wherein said possible values are the binary numbers 0 and 1.

17. A method according to claim 1 or 2 wherein the possible values are the binary numbers 1 and 0, the detector elements are an integral multiple n, including n=1, of the record entries, each frame is repeatedly observed as the position of the record entries relative to the array of detector elements is changed, and the set of modified values is derived by selecting or sampling an observation in which the observed values are each substantially one of said possible values, said predetermined manipulations of observed values comprising disregarding such values.

18. A method according to claim 17 wherein the record entries are arranged in the medium such that their apparent positions relative to the array of detector elements varies as the array moves parallel to the channel containing the record entries.

19. A method according to claim 1 or 2 wherein the record entries are optically scannable zones of variable or varying opacity.

20. A method according to claim 19 wherein the medium is of microfiche type, either a master or a copy.

21. A method according to claim 1 or 2 wherein the modified values are subject to further analysis to correct for integral misregistration between the detector elements and the record entries.

22. A method according to claim 1 or 2 further comprising identifying one or more marker patterns among the modified values, and utilizing the marker pattern(s) to derive from said modified values, an accurate representation of the record entries of the frame, said marker pattern(s) being unable to be replicated in the data and identifying the start and/or end of the respective frames, and the marker pattern(s) being utilized to assign positions and hence significance to the record entries independently of the detector element(s) used to observe them.

23. A method according to claim 22 wherein the possible values are the binary numbers 1 and 0, data bits derived from the observed values are stored in an electronic shift register and shifted until the known patterns fall in certain bit positions connected to a binary identification circuit.

24. A method according to claim 23 wherein the states and/or output of the detector elements are read serially, data bits (1 and 0) derived from the observed values are moved into a shift register serially, and complete data extraction occurs when the marker pattern reaches the part of the shift register connected to the binary identification circuit.

25. A method according to claim 22 wherein the possible values are the binary numbers 1 and 0, the states and/or output of the detector elements are read serially, data bits (1 and 0) derived from the observed values are entered into a detection circuit which blocks the system attempting to acquire the data until one or more of the known patterns is detected 26. Apparatus for reading information stored in a medium as multiple machine readable record entries arranged in frames which are themselves arranged in one or more channels, which record entries are indicative of values from a limited set of possible values, comprising:
a holder to temporarily support or retain said medium;
a substantially known array of detector elements movable relative to said holder, each of which detector elements has a limited filed of observation and in use responds to each record entry within its field of observation in relation to the fraction of the record entry lying within the field of observation;
means to scan each frame with said array such that each record entry is at least partly within the field of observation of at laeast one detector element to produce a first set of observed values for each frame represented by the state and/or outputs of the detector elements; and
means for deriving from the observed values for each frame a second set of values, each being one of said possible values, representing record entries of the frame;
wherin said deriving means, in deriving said second set of values, is arranged to manipulate said observed values relating to the record entries, utilizing the limiations on the range of said possible values, so that at least those observed values ascertained not to be equal to possible values are modified to become one of said possible values, whereby to correct for any fractional misregistration between the record entries and the detector elements.

27. Apparatus according to claim 26 wherein the array of detector elements is arranged to simultaneously observe and store all the record entries of each frame in turn, such observed values being then available for serial read-out for said deriving step.

28. Apparatus according to claim 27 wherein said array includes a semiconductor device comprising a Field-effect transistor layer which has one major face in electrically conductive contact with the detector elements and another major face in electrically conductive contact with a juxtaposed conductor layer, and a strip of material in proximity to the gate of the Field-effect transistor layer selected whereby on propagation of a wave in said material a voltage is generated which opens a moving conduction window in the Field-effect transistor layer.

29. Apparatus according to claim 26 wherein said array is a linear array of equispaced detector elements.

30. Apparatus according to claim 26 wherein said array of detector elements is defined by one or more detectors which are arranged to observe successive spatial positions in respect to which they form transitory detector elements.

31. Apparatus according to claim 26 wherein the detector elements are photosensitive charge storage elements.

32. Apparatus according to claim 26 or 27 wherein said scanning means includes a drive arranged to selectively relatively move the array over the medium in either or both of two mutually perpendicular directions, including a direction parallel to the channels of said medium.

33. Apparatus according to claim 32 wherein the drive is arranged to relatively move the array at substantially constant velocity parallel to the channels and perpendicular to the frames, but stepwise parallel to the frames and perpendicular to the channels.

34. Apparatus according to claim 26 or 27 for optically observing record entries, wherein the scanning means includes a cylindrically curved mirror disposed so the record frame of a medium in said holder lies on the face of the mirror and a further mirror mounted substantially at the axis of curvature of the cylindrical mirror for rotation about an axis parallel to said axis of curvature, whereby optical paths are successively provided between the record frames of a channel and the array of detector elements.

35. Apparatus according to claim 26 or 27 for optically observing record entries, wherein the scanning means includes a spherical or paraboloidal concave mirror or convex lens disposed to face the record frames of a medium in said holder, and a further smaller mirror mounted substantially at the focus of said concave mirror for rotation about at least one axis, whereby optical paths are successively provided between the record frames of a channel and the array of detector elements.

36. Apparatus according to claim 26 wherein said utilizing/deriving means comprises computing means programmed with said limitations on the range of possible values and with instructions for said manipulations of observed values not equal to possible values and so for effecting said derivation of the modified values.

37. Apparatus according to claim 26 wherein said utilizing means is arranged to produce said modified values, while being restricted to values representing only said possible values, at times which vary from the times of presentation of the detector element outputs in a way which reflects the magnitudes of the detector element outputs.

38. Apparatus according to claim 26 wherein said utilizing means includes digital communications circuitry and wherein said observing means is arranged to produce a time-based analog signal which comprises said set of observed values and which is presented to said circuitry for derivation of the modified values.

39. Apparatus according to claim 26 wherein said utilizing means is arranged to derive the set of modified values in part by serially carrying finite observed values less than a prescribed first threshold, itself substantially less than the observed value representing the possible value 1, for addition to respective, serially ordered, other observed values such that the resultant summations exceed said first threshold, but subject to each carried value not exceeding the observed value to which it is added by an amount greater than a second threshold.

40. Apparatus according to claim 26 wherein the utilizing means is arranged to ignore observed values for detector elements at one or more corresponding positions in predetermined uniform configuration sub-arrays of the detector elements, when a predetermined proportion of such elements give observed values sufficiently different from those corresponding to said possible values.

41. Apparatus according to claim 26 wherein said utilizing means is arranged to select as said modified values an observation in which the observed values are each substantially one of said possible values, said predetermined manipulations comprising disregarding other observations.

42. A method of observing a succession of machine readable position markers in a medium comprising:
observing the markers in turn and storing observed values indicating marker position for at least two markers preceding each marker being observed;
determining whether each observed value is outside a selected trend established by the stored values by more than a predetermined margin; and, if so, reducing the effect of that value.

43. A method according to claim 42 wherein the selected trend is initially established by first observing a special marker which is able to be observed with greater confidence in the observation.

44. A method according to claim 43 wherein the trend utilized for said determination is a simple average of the stored values.

45. A method according to claim 43 wherein the trend utilized for said determination is an average of the stored values in which weights, which may be positive or negative, are assigned to the values according to their age.

46. A method according to claim 43 wherein said reduction of the effect of the observed value comprises rejecting the observed value and substituting the value predicted by the trend.

47. Apparatus for observing a succession of machine readable position markers in a medium comprising;
means to observe the markers in turn;
means to store observed values indicating marker position for at least two a predetermined number of markers preceding each marker being observed; and
means to determine whether each observed value is outside a selected trend established by the stored values by more than a predetermined margin, and, if so, to reduce the effect of that value.

48. Apparatus according to claim 47 wherein said determining and rejecting means is arranged so that the trend utilized for said determination is a simple average of the stored values.

49. Apparatus according to claim 47 wherein said determining and rejecting means is arranged so that the trend utilized for said determination is an average of the stored values in which weights, which may be positive or negative, are assigned to the values according to their age.

50. Apparatus according to claim 47 wherein said determining and rejecting means is arranged so that said reduction of the effect of the observed value comprises rejecting the observed value and substituting the value predicted by the trend.

51. Apparatus according to claim 47, 48, 49 or 50 wherein said determining and rejecting means comprises computer means programmed with details in respect to said trend, said predetermined number of entries, said predetermined margin and with instructions for effecting said determination and, if necessary, said rejection.

52. A method of ascertaining the position of detector means with respect to multiple machine readable data entries arranged in frames aligned in one direction, which frames are themselves arranged in plural, generally parallel channels aligned in another direction, machine readable synchronization markers being respectively positioned at at least one end of each channel, comprising the steps of:
observing the full extent of each marker in said one direction with the detector means as it travels substantially in said other direction;
outputting a signal representative of the observation; and
effecting said ascertainment of position by analyzing each observation to identify any response in that observation to features of the markers which are characteristically located with respect to the associated channels.

53. A method according to claim 52 further comprising utilizing said or other features of the markers to ascertain one or more of the orientation of the medium containing said frames, the speed of travel of the read head over the medium parallel to the channels, and the maximum value to be expected for entries in the medium.

54. A method according to claim 52 wherein said observing step utilizes a detector able to observe along a line in said one direction.

55. A method according to claim 52 wherein said observing step utilizes a linear array of detector elements and said observing step comprises simultaneously observing the full extent of each marker in said direction with the detector elements of said array while the array extends in said one direction.

56. Apparatus for ascertaining the position of a read head with respect to multiple machine readable data entries arranged in frames aligned in one direction, which frames are themselves arranged in plural, generally parallel channels aligned in another direction, machine readable synchronization markers respectively being positioned at at least one end of each channel, comprising:
detector means for observing along a line;
means for moving said detector means in said other direction over said markers and along said channels;
means for causing the detector means to observe the full extent of each marker in said one direction and to output a signal representation of the observation; and
means for ascertaining the position of the read head by analyzing each observation to identify any response in that observation to features of the markers which are characteristically located with respect to the associated channels.

57. Apparatus according to claim 56 wherein said ascertaining means further utilizes said or other features of the markers to ascertain one or more of the orientation of the medium containing said frames, the speed of travel of the read head detector means over the medium parallel to the channels, and the maximum value to be expected for entries in the medium.

58. Apparatus according to claim 56 wherein said ascertaining means comprises computing means programmed with data concerning said feature(s) and with instructions so as to comprise the ascertaining means.

59. Apparatus according to claim 56 wherein said detector means comprises a linear array of detector elements, and said moving means moves the array in said other direction while the array extends in said one direction, and said causing means causes the detector elements to simultaneously observe the full extent of each marker in said one direction.

* * * * *